United States Patent
Factor et al.

(10) Patent No.: US 7,664,766 B2
(45) Date of Patent: Feb. 16, 2010

(54) SYSTEM, METHOD AND COMPUTER PROGRAM PRODUCT FOR MANAGING DATA

(75) Inventors: Michael Factor, Haifa (IL); Shachar Fienblit, Ein Ayala (IL); Guy Laden, Tel Aviv-Jaffa (IL); Paula Ta-Shma, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 11/531,130

(22) Filed: Sep. 12, 2006

(65) Prior Publication Data
US 2008/0065669 A1    Mar. 13, 2008

(51) Int. Cl.
G06F 17/00 (2006.01)
G06F 7/00 (2006.01)

(52) U.S. Cl. .................. 707/101; 707/202; 707/203; 707/204

(58) Field of Classification Search .......... None
See application file for complete search history.

(56) References Cited

U.S. PATENT DOCUMENTS

| | | | | |
|---|---|---|---|---|
| 5,577,240 A | * | 11/1996 | Demers et al. | 707/8 |
| 5,717,913 A | * | 2/1998 | Driscoll | 707/5 |
| 5,758,356 A | | 5/1998 | Hara et al. | |
| 5,878,434 A | * | 3/1999 | Draper et al. | 707/202 |
| 6,282,605 B1 | * | 8/2001 | Moore | 711/103 |
| 6,366,900 B1 | * | 4/2002 | Hu | 707/1 |
| 6,366,988 B1 | | 4/2002 | Skiba et al. | |
| 6,453,389 B1 | * | 9/2002 | Weinberger et al. | 711/137 |
| 6,816,872 B1 | | 11/2004 | Squibb | |
| 2005/0063374 A1 | | 3/2005 | Rowan et al. | |
| 2005/0065962 A1 | | 3/2005 | Rowan et al. | |
| 2005/0066118 A1 | | 3/2005 | Perry et al. | |
| 2005/0066222 A1 | | 3/2005 | Rowan et al. | |
| 2005/0066225 A1 | | 3/2005 | Rowan et al. | |
| 2005/0071336 A1 | | 3/2005 | Najork et al. | |
| 2005/0071379 A1 | | 3/2005 | Kekre et al. | |
| 2005/0076261 A1 | | 4/2005 | Rowan et al. | |
| 2005/0076262 A1 | | 4/2005 | Rowan et al. | |
| 2005/0076264 A1 | | 4/2005 | Rowan et al. | |

(Continued)

FOREIGN PATENT DOCUMENTS

GB    2411030    8/2005

(Continued)

OTHER PUBLICATIONS

U.S. Appl. No. 11/297,126, filed Dec. 7, 2005.
"The BT-Tree: A Branched and Temporal Access Method", Jiang, Salzberg, Lomet, Barrena, Proceedings of the 26th VLDB Conference, 2000.

(Continued)

Primary Examiner—Greta L Robinson
Assistant Examiner—James J Wilcox

(57) ABSTRACT

A method and computer readable product for managing data, the method includes: providing a first data structure representative of insert or update operations to entries identified by keys and providing a second data structure representative of branch creation operations wherein the second data structure stores branch identifiers and branch timing information; receiving a request to lookup a version of data at a read timestamp; scanning the first and the second data structures to locate that version of data; and receiving a request to create a branch that starts by a version of data at a requested timestamp and updating the second data structure accordingly.

21 Claims, 18 Drawing Sheets

U.S. PATENT DOCUMENTS

| | | | |
|---|---|---|---|
| 2005/0177603 A1 | 8/2005 | Shavit | |
| 2005/0193031 A1 | 9/2005 | Midgley et al. | |
| 2005/0193035 A1 | 9/2005 | Byrne | |
| 2005/0193272 A1 | 9/2005 | Stager et al. | |
| 2006/0294118 A1* | 12/2006 | Lubbers et al. | 707/100 |
| 2007/0118547 A1* | 5/2007 | Gupta et al. | 707/101 |
| 2007/0168707 A1* | 7/2007 | Kern et al. | 714/6 |

FOREIGN PATENT DOCUMENTS

| | | |
|---|---|---|
| WO | WO0197071 | 12/2001 |
| WO | WO2004104866 | 12/2004 |

OTHER PUBLICATIONS

"The BTR-Tree: Path-Defined Version-Range Splitting in a Branched and Temporal Structure", Jiang, Salzberg, Lomet, Barrena, Symposium for Advances in Spatial and Temporal.

Marcos Aguilera et al., "Olive: Distributed Point-in-Time Branching Storage for Real Systems", Hewlett-Packard Laboratories, Palo Alto 3rd Symposium on Networked Systems Design and Implementation, May 2006.

Ben Pfaff et al., "Virtualization Aware File Systems: Getting Beyond the Limitations of Virtual Disks", m 3rd Symposium on Networked Systems Design and Implementation (NSDI 06).

* cited by examiner

300

700

SYSTEM, METHOD AND COMPUTER PROGRAM PRODUCT FOR MANAGING DATA

FIELD OF THE INVENTION

The present invention relates to methods, systems and computer program products for managing data.

BACKGROUND OF THE INVENTION

Data can evolve over time. In many applications there is a need to retrieve a previous version of data. One solution is continuous data protection (CDP). U.S. patent application publication serial number 2005/0066118 of Perry et al., and U.S. patent application publication serial number 2005/0193272, all being incorporated herein by reference, describe prior art devices and method for continuous data protection.

Various data structures were suggested for tracking the evolution of data over time. The following articles, both being incorporated herein by reference, illustrates two data structures known as the BT-tree and the BTR-Tree: "The BT-Tree: A Branched and Temporal Access Method", Jiang, Salzberg, Lomet, Barrena, Proceedings of the 26th VLDB Conference, 2000; "The BTR-Tree: Path-Defined Version-Range Splitting in a Branched and Temporal Structure", Jiang, Salzberg, Lomet, Barrena, Symposium for Advances in Spatial and Temporal Databases, 2003.

These branched temporal indexes can be maintained if certain assumptions are fulfilled. According to a first assumption entries of the branch temporal indexes are inserted in order of increasing timestamp.

In addition, these data structures are non-standard and the update of these structures can be relatively complex and involve duplicating data and even metadata. In addition the maintenance of these data structures may require reference counters.

The following U.S patent applications and U.S. patents, all being incorporated herein by reference, also describe various methods for managing data: U.S. patent application publication serial number 2005/0066222 of Rowan et al., U.S. patent application publication serial number 2005/0076262 of Rowan et al., U.S. patent application publication serial number 2005/0065962 of Rowan et al.; U.S. patent application publication serial number 2005/0063374 of Rowan et al.; U.S. patent application publication serial number 2005/0076264 of Rowan et al.; U.S. patent application publication serial number 2005/0066225 of Rowan et al.; U.S. patent application publication serial number 2005/0076261 of Rowan et al.; U.S. patent application publication serial number 2005/0066118 of Perry el at., and U.S. patent application publication serial number 2005/0071379 of Kekre et al.

There is a growing need to provide devices, computer program products and methods that will enable one to manage data.

SUMMARY OF THE PRESENT INVENTION

A method for managing data, the method includes: providing a first data structure representative of insert or update operations to entries identified by keys and providing a second data structure representative of branch creation operations wherein the second data structure stores branch identifiers and branch timing information; receiving a request to lookup a version of data at a read timestamp; scanning the first and the second data structures to locate that version of data; receiving a request to create a branch that starts by a version of data at a requested timestamp and updating the second data structure accordingly.

Conveniently, the first data structure is a BTree.

Conveniently, the method includes receiving a request to update a value associated with a given key and updating the first data structure.

Conveniently, the updating is performed by adding a new entry with the given key and associated data and the current timestamp.

Conveniently, the key is a logical block address.

Conveniently, the request to create a branch is a revert operation and wherein the certain time stamp is a revert-to time.

Conveniently, the looking for a branch includes scanning branch timing information.

Conveniently, the method includes refreshing the first and second data structures in response to a data storage policy.

Conveniently, the refreshing includes performing a coarse analysis of entries of the second data structure.

Conveniently, the refreshing includes performing a fine analysis of entries of the first and second data structures.

Conveniently, the refreshing is responsive to at least one relevancy window.

Conveniently, the refreshing is responsive to at least one data storage granularity.

Conveniently, the refreshing is responsive to multiple data storage granularities that are responsive to a time lapse from a current point in time.

Conveniently, the refreshing is responsive to a relationship between an entry of the first data structure and between a subset of entries of the first data structure.

Conveniently, the refreshing is responsive to a relationship between an entry of the first data structure and between entries of the first data structure.

Conveniently, the branch timing information comprises a branch start time, a branch end time and the requested time stamp.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1A:
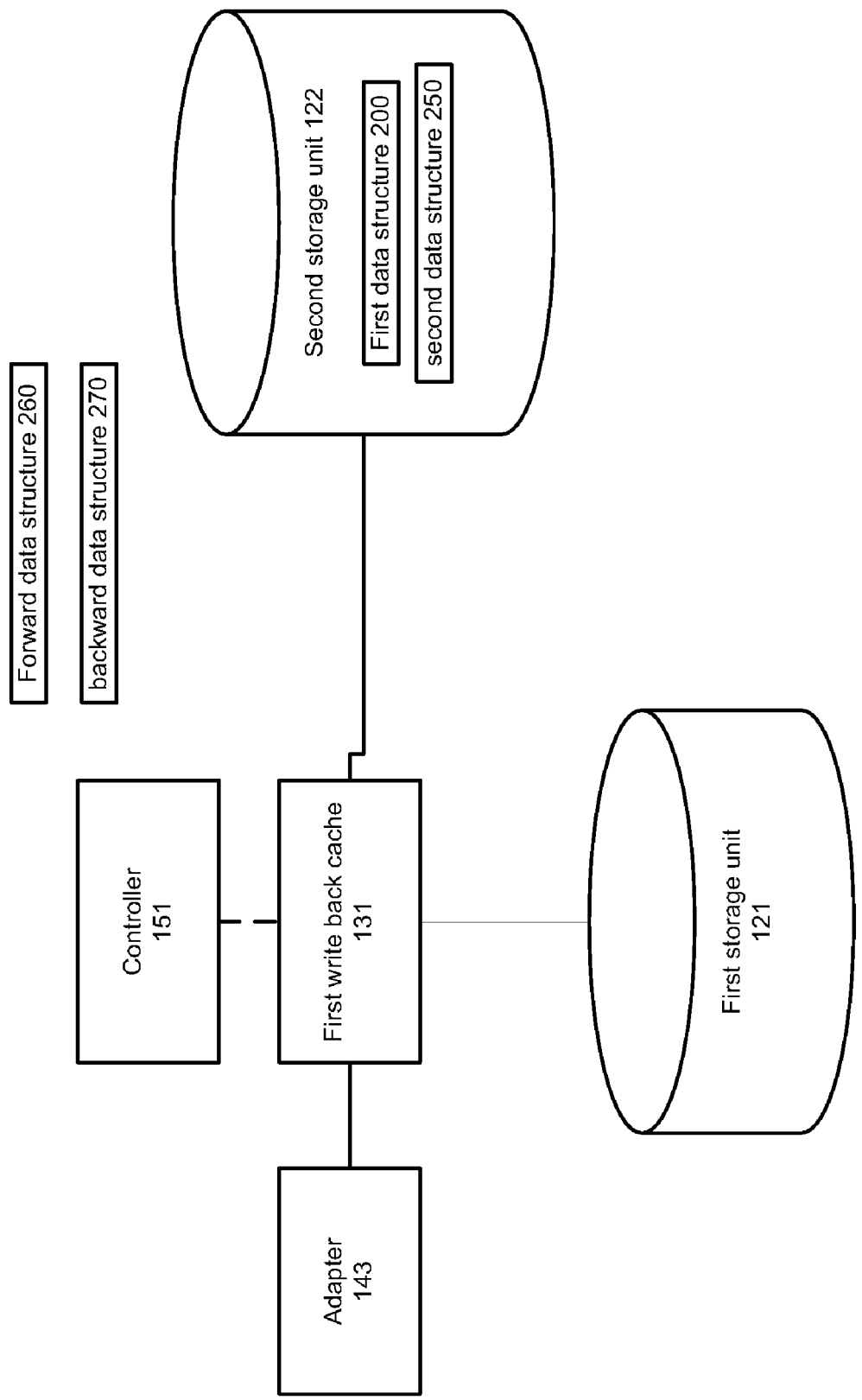
FIG. 1A illustrates a system for managing data, according to a embodiment of the invention.

The invention provides a method, system and computer program product for storing and retrieving multiple versions of data.

According to an embodiment of the invention data and metadata associated to the data are provided. The data can include at least a current version of the data and at least one previous version of the data. The metadata is conveniently organized in two data structures. The first data structure includes information relating to data update operations. The first data structure is conveniently an extended B-Tree data structure. The second data structure includes information relating to revert operations (possibly also clone creation information). The second data structure is also referred to as a branch table. Efficient data update, lookup and revert operations can be applied when these two data structures are used.

Conveniently, update operations are represented by entries in the B-tree data structure while revert operations are represented by entries in the second data structure. A lookup operation may include looking at both data structures in order to find the requested data.

According to an embodiment of the invention the first data structure is significantly larger than the second data structure. The entries of the first data structure are allocated per write or per destage operation (according to the addresses of the write or destage), while the entries of the second data structure are allocated per revert operation. Typically, the number of revert operations is much smaller than the number of write operations. A branch that was initialized by a revert operation may be associated with multiple entries in the first data structure corresponding to write/destage operations. By using two different data structures the update of the first data structure (the B-Tree) can be simplified, and standard B-Tree update algorithms can be used. Conveniently, the B-Tree can be updated by inserting entries that are out of timestamp order.

The evolution of data over time, and especially update and revert operations are represented by a graph. The graph can include one or more branches, whereas a first branch (also referred to as a parent branch) illustrates a first sequence of update operations. Each revert operation initiates a branch that can include multiple entries, each entry representative of update operations to a key. A branch can terminate when a new revert operation is executed. The graph illustrates the content of the first and second data structures.

Conveniently, the two data structures are implemented in continuous data protection (CDP) systems, thus a CDP system can easily reconstruct stored data from a certain point in time. Revert operations are fast and do not prevent the execution of other revert operations.

Metadata and data are not duplicated during the lookup, update and revert operations. This greatly reduces the size of the data and metadata. Conveniently, the sharing of data between branches is maximized and reference counts can be avoided.

According to an embodiment of the invention only one active branch can exist at any point in time. According to another embodiment of the invention multiple active branches can exist concurrently. The metadata that is required for managing data can differ from the former case to the latter case.

According to an embodiment of the invention each entry of the first data structure includes a logical block address (L), a write timestamp (WTS) representing the time of execution of a write operation and a physical address (P) associated with the logical block address.

According to another embodiment of the invention each entry of the first data structure includes a logical block address (L), an overwrite timestamp (OTS) representing the time of execution of a subsequent write operation which overwrites the current data and a physical address (P) associated with the logical block address.

According to another embodiment of the invention each entry includes a logical block address, offset and length.

Conveniently, the logical block address forms a key that is used to access the first data structure. Conveniently, each entry also includes a branch identifier (BID), especially when multiple active branches can exist concurrently.

The first data structure can be accessed by a key. In one embodiment the key includes a logical block address. An enhanced key can also include a BID and/or a timestamp.

According to an embodiment of the invention each entry of the second data structure includes a branch identifier (BID), a branch start time, a branch end time and a branch revert-to-time. Conveniently, each entry also includes a branch identifier of a parent branch and a branch identifier.

An update request includes the key and data to be written. Conveniently, if multiple active branches can concurrently co-exist then an enhanced key can be required. For one embodiment a write operation involves updating the first data structure and writing the data to a physical block address (P) associated with the logical block address that is included in the key.

A revert request includes a branch start time (which can be the time of the execution of the revert request or the time of reception of the revert request), a time to revert to and optionally a parent branch identifier. Conveniently, if only one active branch can exist at a given point of time then the parent branch identifier does not need to be provided. A revert operation involves updating the second data structure.

A lookup request includes a key and a lookup timestamp. If multiple active branches can concurrently co-exit then an enhanced key can be required. A lookup operation involves looking for the entry that is valid at the given lookup timestamp. This may include a sequence of regular B-Tree lookups, starting from a requested branch, continuing to its parent branch, and so on, until either the appropriate entry is found, or a branch with no parents is found and a not-found answer is provided.

According to various embodiments of the invention a data storage policy can be applied. A first exemplary data storage policy defines a relevancy window. It is only possible to revert to a timestamp that is within the relevancy window. Data that is accessible within the relevancy window as well as metadata relating to that data should be maintained, while data that is not accessible in the relevancy window and associated metadata can be deleted. It is noted that data whose timestamp is outside the relevancy window might be accessible as a result of a sequence of revert and lookup operations, thus before deleting data and the associated metadata the accessibility of the data to lookup and revert operations is checked. Yet another data storage policy can define multiple relevancy windows.

Conveniently, not all the old versions of data are stored. For example, data storage granularity can be defined. Data storage granularity defines a period that is represented by one (on none) version of data. If during that period multiple versions of data are generated then one of these versions is stored. It is noted that according to another embodiment of the invention a data version is stored for any timestamp at which an event was generated. Conveniently a version is stored for any timestamp where an event was generated.

According to an embodiment of the invention the data storage policy defines multiple data storage granularities. Typically, the data storage granularity gets coarser as the data versions get older. A data storage granularity can be fixed per each relevancy window, but this is not necessarily so.

For simplicity of explanation it is assumed that a single relevancy window is defined.

According to an embodiment of the invention the data storage policy determines which entries are accessible after some sequence of revert and lookup operations. Various accessibility detection processes can be applied, wherein each process provides a tradeoff between coverage and complexity (or execution time).

Conveniently, the accessibility detection process includes a coarse analysis and a fine analysis. Conveniently, the coarse analysis includes processing whole branches while the fine analysis includes processing entries.

The coarse analysis can involve removing a branch or unifying branches. The coarse analysis can also include removing a branch end section that is entirely outside a relevancy window wherein that end section starts at a latest revert-to time of any child of that branch.

Conveniently, if a branch is entirely outside the relevancy window and does not have associated children branches then it is removed. If a branch is entirely outside the relevancy window but has a single child branch then the branch and the child branch can be united by moving the branch to its child branch.

The coarse analysis includes scanning the second data structure while the fine analysis includes scanning both the first and second data structures.

The fine analysis conveniently scans one page of the first data structure at a time, one key after the other. The branches that are associated with a single key are scanned one entry after the other.

According to an embodiment of the invention there are at least two types of fine analysis. A first type is referred to as a global fine analysis while the other is referred to as a local fine analysis. For a given key, the global fine analysis can scan potentially all of the entries of the first data structure with this key, while the local fine analysis scans only a portion (subset) of these entries.

Conveniently, the local fine analysis can guarantee that the number of accessible entries exceeds the number of non-accessible entries. It is noted that alternatives to these above mentioned analyses can be applied.

Conveniently, the global fine analysis checks, for each combination of a certain key and a certain branch, whether an entry of the first data structure that includes this combination is an accessible entry by recursively scanning entries representative of update operations in descendent branches of that certain branch.

Conveniently, the local fine analysis checks, for each combination of a certain key and a certain branch, whether an entry of the first data structure that includes this combination is an accessible entry by scanning entries representative of update operations in the child branches of the certain branch.

Non-accessible entries can be deleted while exposed entries should remain.

Conveniently, the number of entries within the first data structure for each branch is maintained, and a ranch is removed when it has no corresponding entries.

According to various embodiments of the invention a storage space reclamation process can be initiated in various manners—it can be executed in a continuous manner, in a periodical manner, in a pseudo-random manner, in a random manner, in response to an occurrence of events (such as in response to a size limit of the user data or meta-data, an execution of a certain number of lookup operations, update operations and/or revert operations), and the like. The time lapse from one execution of a storage space reclamation process to another can be responsive to the size of one or more relevancy windows. Conveniently, the process is initiated when an event occurs. The event can include the exclusion of a branch from a relevancy window, when a page of the first data structure is filled or merged into another page, and the like.

For simplicity of explanation the following figures will illustrate certain embodiments of the invention where the second data structure represents revert operations, the revert operations are made to a data version at a revert-to time, the key that is used for write operations is a logical block address. It is noted that the methods, systems, and computer readable medium can be applied mutatis mutandis when the second data structure represents branch creation operations (such as revert, duplication an existing branch and the like), that the branch creation operations create a branch that starts by a data version at a requested timestamp (the requested timestamp is associated with the version of data and does not necessarily reflect the time of the creation of the branch), and the key can differ from a logical block address.

FIG. 1A illustrates system 100 for managing data, according to an embodiment of the invention. System 100 has a distributed architecture.

System 100 includes first write-back cache unit 131 that is connected to an adapter 143, first storage unit 121 and to second storage unit 122.

System 100 includes controller 151 although the controller can be included within the first write-back cache unit 131. First write-back cache unit 131 receives requests to read data, receives requests to write data and receives data from adapter 143 that can be connected to other devices. First write-back cache unit 131 outputs data to adapter 143.

It is noted that first write-back cache unit 131 can be connected to multiple interfaces, adapters and the like.

System 100 maintains four data structures: (i) first data structure 200 representative of write operations, (ii) second data structure 250 representative of revert operations, (iii) third data structure (also referred to as forward data structure) 260 indicative of which data to send from the first storage unit to a second storage unit and (iv) fourth data structure (also referred to as backward data structure) 270 that indicates whether a most updated version of data lies in first storage unit 121 or in second storage unit 122.

Each one of these data structures can be stored in various locations in system 100, for example all data structures 200, 250, 260 and 270 can be stored in second storage unit 122, but this is not necessarily so.

Third data structure 260 is updated when destage periods start and when data versions are copied from the first to second storage unit.

Conveniently, only one data version (per data allocation unit) is copied. In order to know whether a currently cached data version should be copied the first data structure can be scanned. In order to avid this scan the third data structure 260 indicates if the currently cached data should be copied.

Conveniently, third data structure 260 includes bit per data allocation unit. The bit indicates if currently cached data version and a new data version (both associated with the same cache data allocation unit) belong to the same destage period. If the answer is positive the currently cached data version is not copied. A bit of the third data structure is set when the first caching operation occurs per a current destage period. At the end of that destage period the bit is reset.

Fourth data structure 270 is updated as a response to revert operation and stage and destage operation that follow the revert operation.

A revert operation required data to be sent from the second storage unit to the first storage unit. This process is time consuming and in order to allow the system to respond to data requests during this process the foruth data structure is used.

It is noted that after a revert operation (to a ceratin point in time) the most updated data versions correspond to that point in time. Accordingly they can be data versions that were regarded, before the revert operation to destaged data versions and to older data versions.

Fourth data structure 270 can include a bit per data allocation unit. If a revert operation is requested the bits can be set. Once data that is stored at a data allocation unit of the second storage unit is stored in the first storage unit the bit is reset.

Data can be cached in first write-back cache unit 131 and then destaged to first storage unit 121. Data from first storage unit 121 can be sent, via the first write-back cache unit 131 to the second storage unit 122. The first storage unit 121 stores staged (current) data versions while the second storage unit 122 stores older data versions. A revert can require to stage data from the first and/or the second storage units 121 and 122.

Controller 151 is adapted to: (i) receive a request to write a new data version to a certain cache data allocation unit, (ii) determine, in response to a data storage policy, whether to overwrite a cached data version currently cached in the certain cache data allocation unit or to perform a destage of the cached data version to a first storage unit before writing the new data version to the certain cache data allocation unit; (iii) receive a request to read a data version that corresponds to a certain point in time and (iv) scan a first data structure representative of write operations and a second data structure representative of revert operation to determine a location of the requested data version. The first and second data structures are illustrated in FIG. 1K.

The controller 151 controls the various components of system 100 to provide the requested data version and to selectively (in response to the controller's determination) perform a forced destage.

Conveniently, first write-back cache unit 131 is not adapted to store multiple versions of the same data. Thus, before a new data version is cached the controller 151 has to decide whether the cached data version should be saved in a data storage unit or not. The decision is responsive to the data storage policy.

According to another embodiment the first write-back cache unit 131 is adapted to store multiple versions of the same data.

System 100 and especially controller 151 can control the operation of first write-back cache unit 131 by using intercepts.

System 100 can define, partially define, partially receive or receive a data storage policy that defines at least one data relevancy window. The relevancy window affects staging and destaging operations between first write-back cache unit 131 and first and second storage units 121 and 122.

Figure 1B:
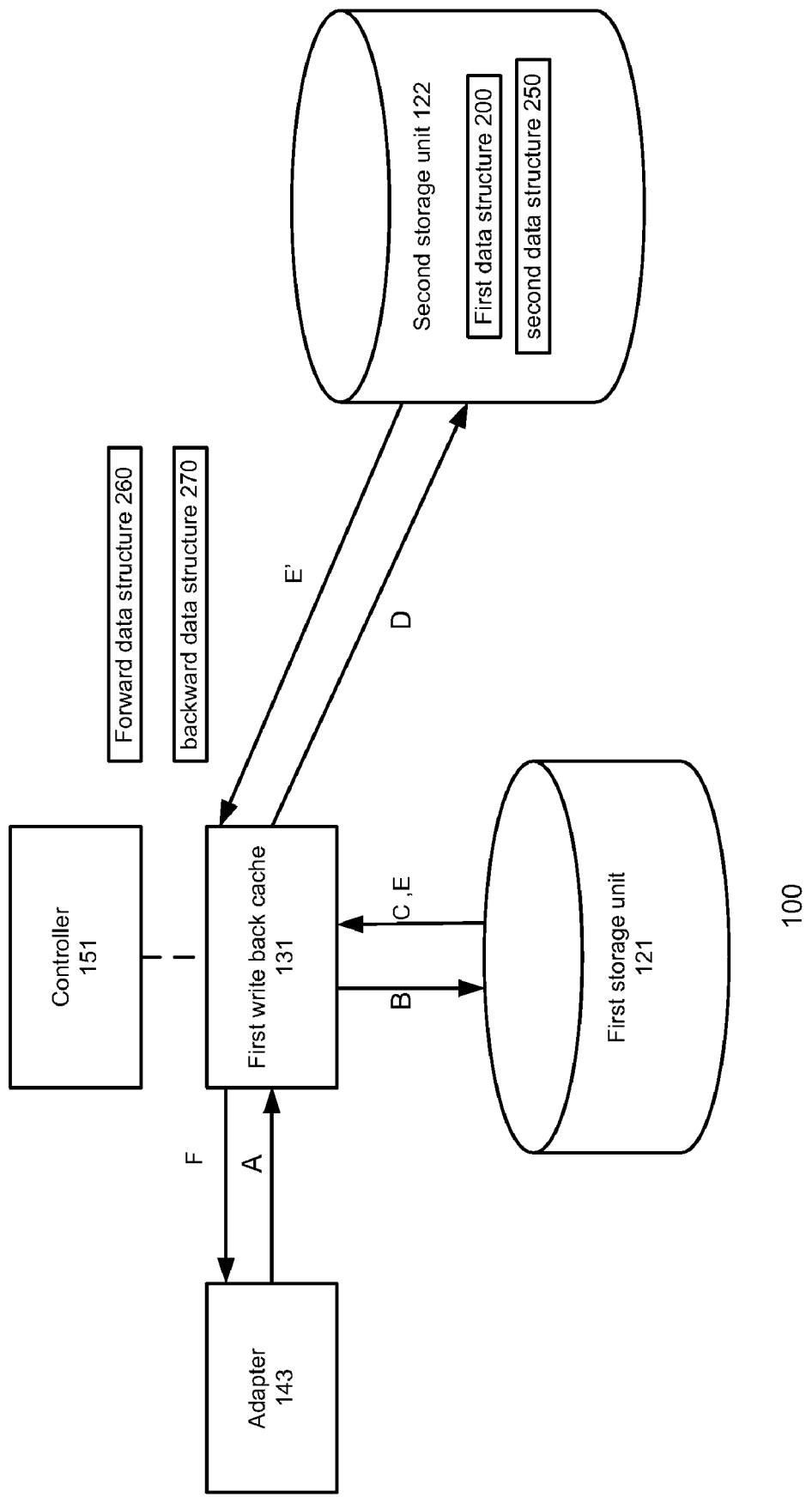
FIG. 1B illustrates an exemplary sequence of stage and a destage operations, according to a embodiment of the invention.

FIG. 1B illustrates an exemplary sequence of stage and a destage operations to a single data version of a single allocation unit, according to an embodiment of the invention.

The sequence starts by a step of sending (illustrated by letter A), from adapter 143, a request to write a new data version to a certain cache data allocation unit of first write-back cache unit 131. If a cached data version that is currently cached in that certain cache allocation unit should be destaged (according to the data storage policy) then it is destaged to first data storage unit 121 (illustrated by letter B) to provide a destaged data version. After this destage step the new data version is cached at the certain cache data allocation unit.

The destaged data version can become an older data version, especially if a newer data version is cached and then destaged. Before it is overwritten, the older data version can be staged (illustrated by letter C) from first storage unit 121 to first write-back cache 131 and then destaged (illustrated by letter D) to second storage unit 122.

When a request to read a data version that corresponds to a certain point in time is received the requested data version can be staged from first storage unit 121 (illustrated by letter E) or from second storage unit 122 (illustrated by letter E'). The requested data version is then sent from first write-back cache unit 131 to adaptor 143.

According to an embodiment of the invention the first storage unit 121 does not store write timestamps. The second storage unit can open a dummy entry in the first data structure that indicates when an older data version was received. This dummy entry is converted to a normal entry once a destaged data version is sent to second storage unit 122.

Figure 1C:
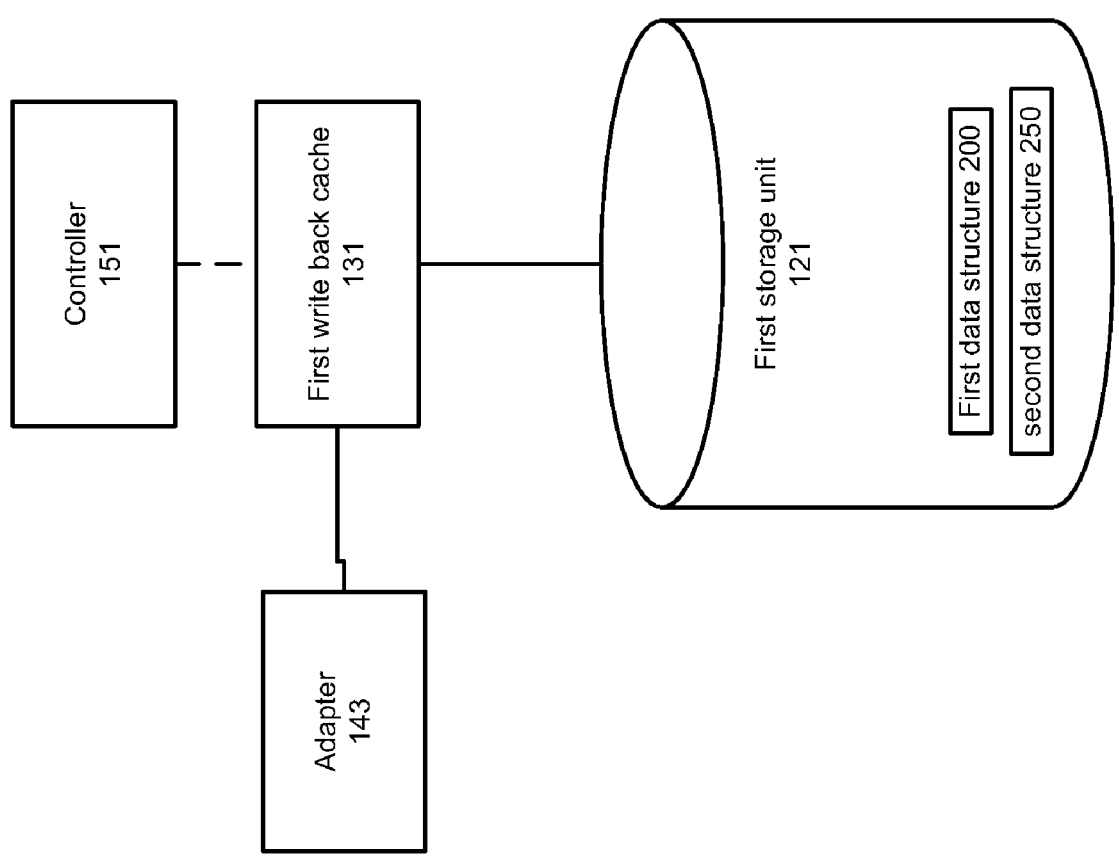
FIG. 1C illustrates a system for managing data, according to another embodiment of the invention.

FIG. 1C illustrates system 100' for managing data, according to another embodiment of the invention. FIG. 1C illustrates a centralized architecture.

System 100' includes first write-back cache unit 131 that is connected to adaptor 143 and to first storage unit 121.

System 100' differs from system 100 of FIG. 1A by not including second storage unit 122. Accordingly, the forward and backward data structures 260 and 270 are not required, as there is only one storage unit.

Figure 1D:
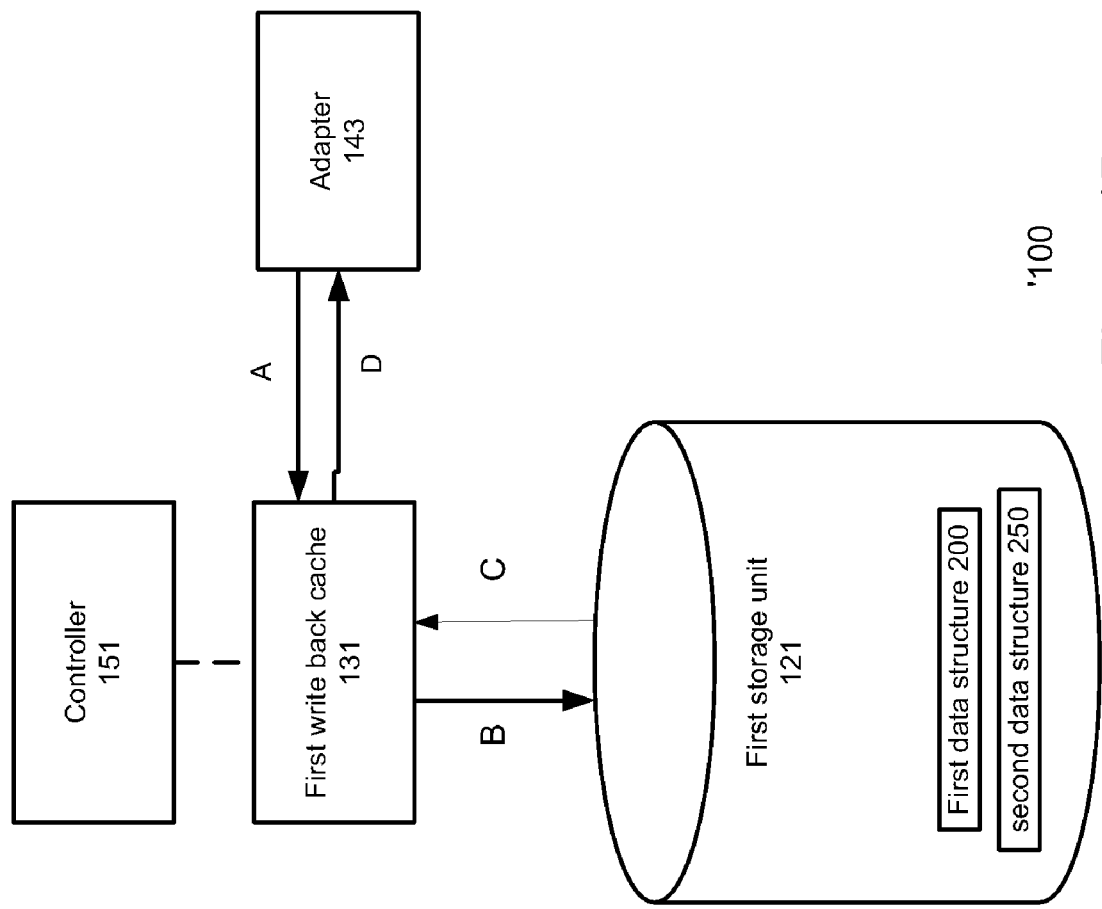
FIG. 1D illustrates an exemplary sequence of stage and a destage operations, according to an embodiment of the invention.

FIG. 1D illustrates an exemplary sequence of stage and a destage operations, according to an embodiment of the invention.

The sequence starts by a step of sending (illustrated by letter A), from adapter 143, a request to write a new data version to a certain cache data allocation unit of first write-back cache unit 131. If a cached data version that is currently cached in that certain cache allocation unit should be destaged (according to the data storage policy) then it is destaged to first data storage unit 121 (illustrated by letter B) to provide a destaged data version. After this destage step the new data version is cached at the certain cache data allocation unit.

The destaged data version can become an older data version, especially if a newer data version are cached and then destaged. The older data version are also stored in first data storage unit 121.

When a request to read a data version that corresponds to a certain point in time is received the requested data version is staged from first storage unit 121 (illustrated by letter C). The requested data version is then sent from first write-back cache unit 131 to adaptor 143.

Figure 1E:
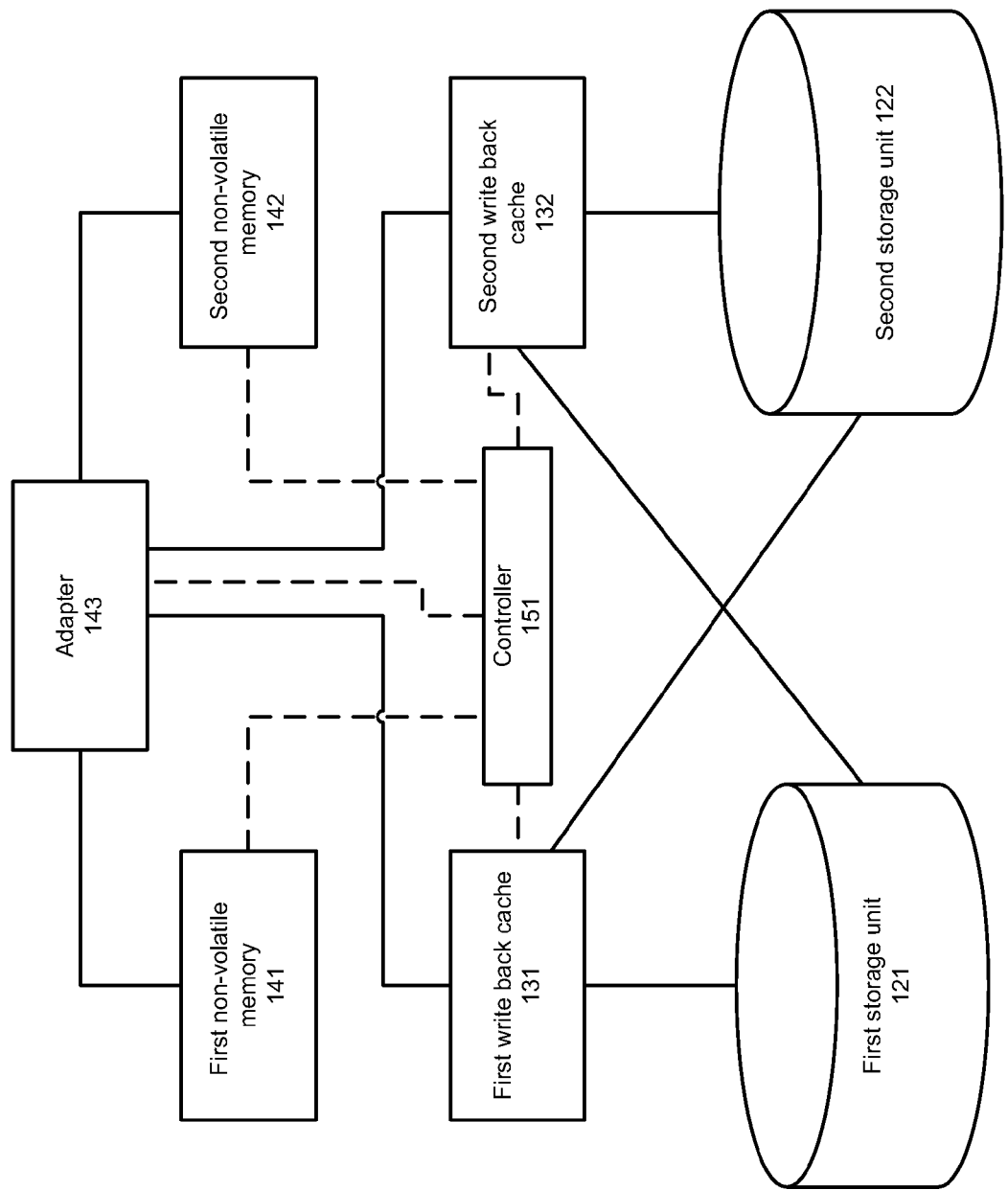
FIG. 1E illustrates a system for managing data, according to a further embodiment of the invention.

FIG. 1E illustrates system 100" for managing data, according to a further embodiment of the invention.

System 100" includes first write-back cache unit 131, second write-back cache unit 132, first non-volatile memory 141, second non-volatile memory 142, controller 151, adaptor 143, first storage unit 121 and second storage unit 122. It is noted that a non-volatile memory can also be included in other configurations of the system, such as in the configuration illustrated in FIGS. 1A, 1B, 1C and 1D.

System 100" includes two parts that are substantially mutually independent. One part backups the other part. Conveniently, each part has its own power supply unit, its own controller and the like. For simplicity of explanation a single controller 151 as well as a single adaptor 143 are shown, although they can also be duplicated.

The first part of system 100" includes first non-volatile memory 141, first write-back cache unit 131 and first storage unit 121. The second part of system 100" includes second non-volatile memory 142, second write-back cache unit 132 and second storage unit 122.

Controller 151 is connected to first write-back cache unit 131, second write-back cache unit 132, first non-volatile memory 141 and second non-volatile memory 142. Adapter 143 is connected to first write-back cache unit 131, second write-back cache unit 132, first non-volatile memory 141 and second non-volatile memory 142.

First storage unit 121 is connected to first write-back cache unit 131 and to second write-back cache unit 132. Second storage unit 122 is connected to first write-back cache unit 131 and to second write-back cache unit 132.

Data that is sent to first write-back cache unit 131 is also sent to second non-volatile memory 142. Data that is sent to second write-back cache unit 132 is also sent to first non-volatile memory 141.

In addition, each of the first storage unit 121 and the second storage unit 122 can store data from first write-back cache unit 131 as well as from second write-back cache unit 132.

As mentioned above system 100" has two parts. For simplicity of explanation FIGS. 1F-1J illustrate write and read operations to the first part (especially to first write-back cache unit 131). Those of skill in the art will appreciate that read and write operations to the second part are executed in a symmetrical manner.

Figure 1F:
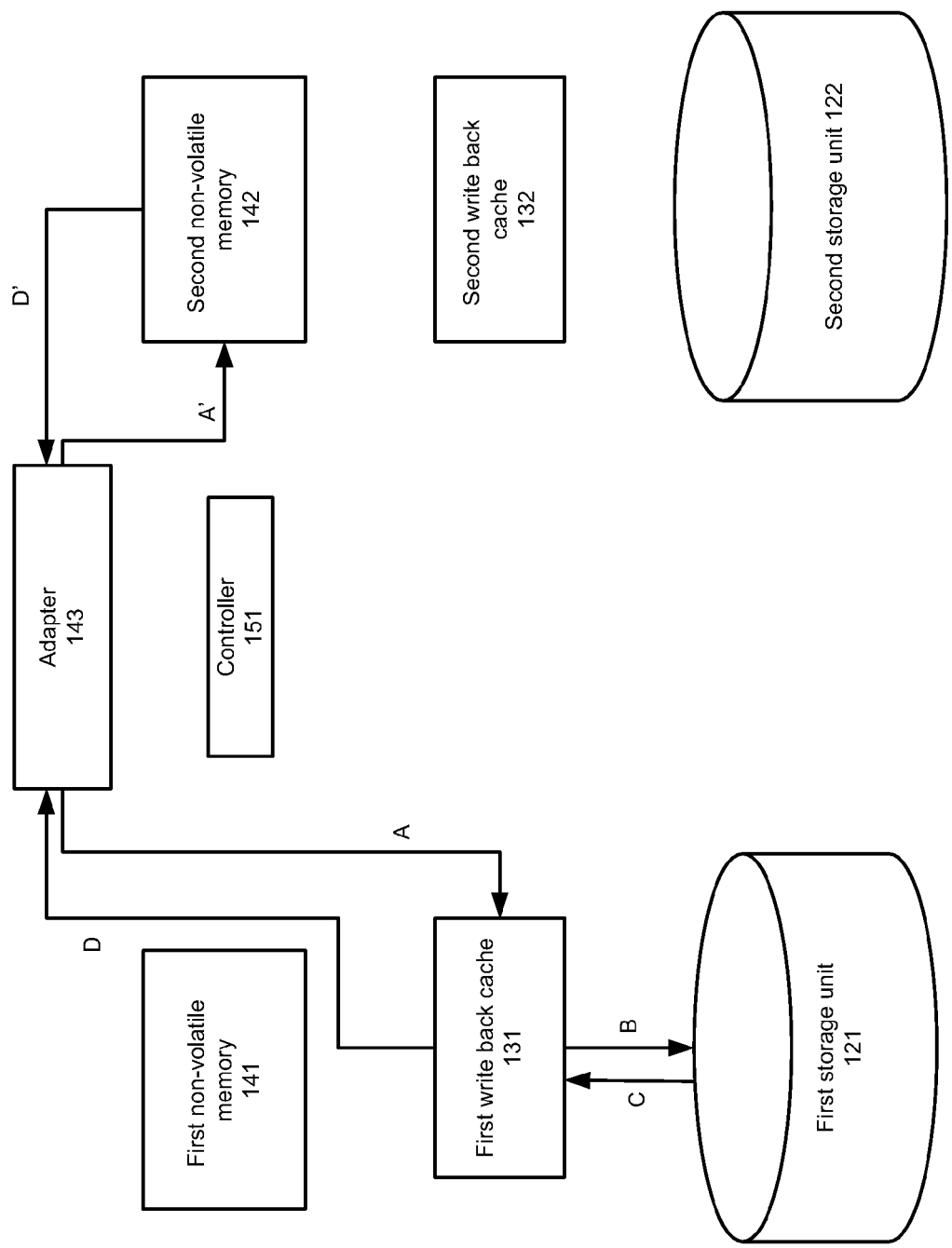
FIG. 1F illustrates an exemplary sequence of a write, read stage and destage operations, according to another embodiment of the invention.

FIG. 1F illustrates an exemplary sequence of a write, read stage and destage operations, according to another embodiment of the invention.

FIG. 1F illustrates a centralized architecture as first data storage unit 121 stores both destaged data versions and older data versions.

The sequence illustrated in FIG. 1F differs from the sequence of FIG. 1D by writing the new data version to second non-volatile memory 142 (illustrated by letter A') in addition to caching it at first write-back cache unit 131. Accordingly, if the first part fails that data version can be retrieved (illustrated by letter D') from second non-volatile memory unit 142.

Figure 1G:
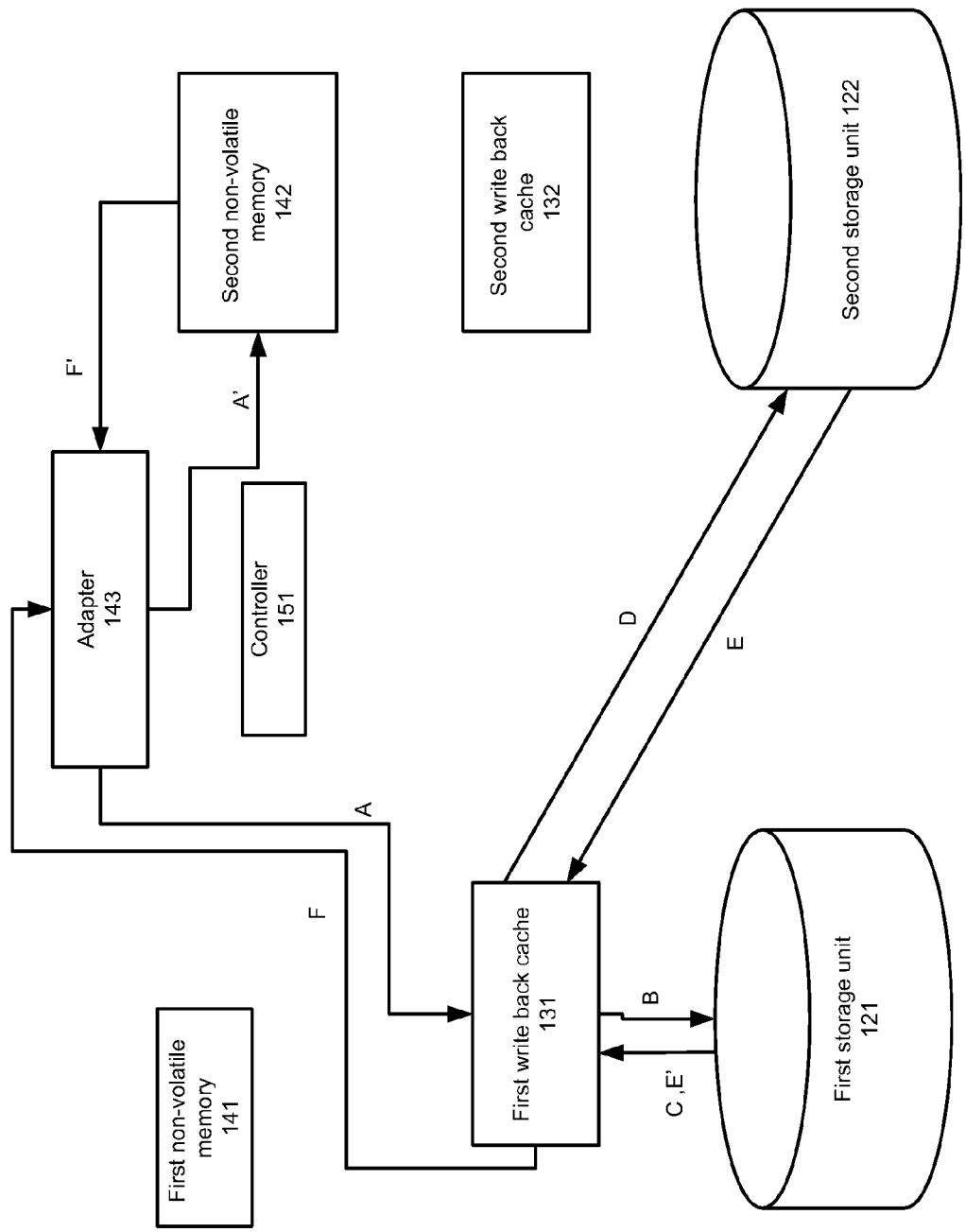
FIG. 1G illustrates an exemplary sequence of a write, read stage and destage operations, according to yet another embodiment of the invention.

FIG. 1G illustrates an exemplary sequence of a write, read stage and destage operations, according to yet another embodiment of the invention.

FIG. 1G illustrates a distributed architecture as first data storage unit 121 stores destaged data versions and second storage unit 122 stores older data versions.

The sequence illustrated in FIG. 1G differs from the sequence of FIG. 1B by writing the new data version to second non-volatile memory 142 (illustrated by letter A') in addition to caching it at first write-back cache unit 131. Accordingly, if the first part fails that data version can be retrieved (illustrated by letter F') from second non-volatile memory unit 142.

Figure 1H:
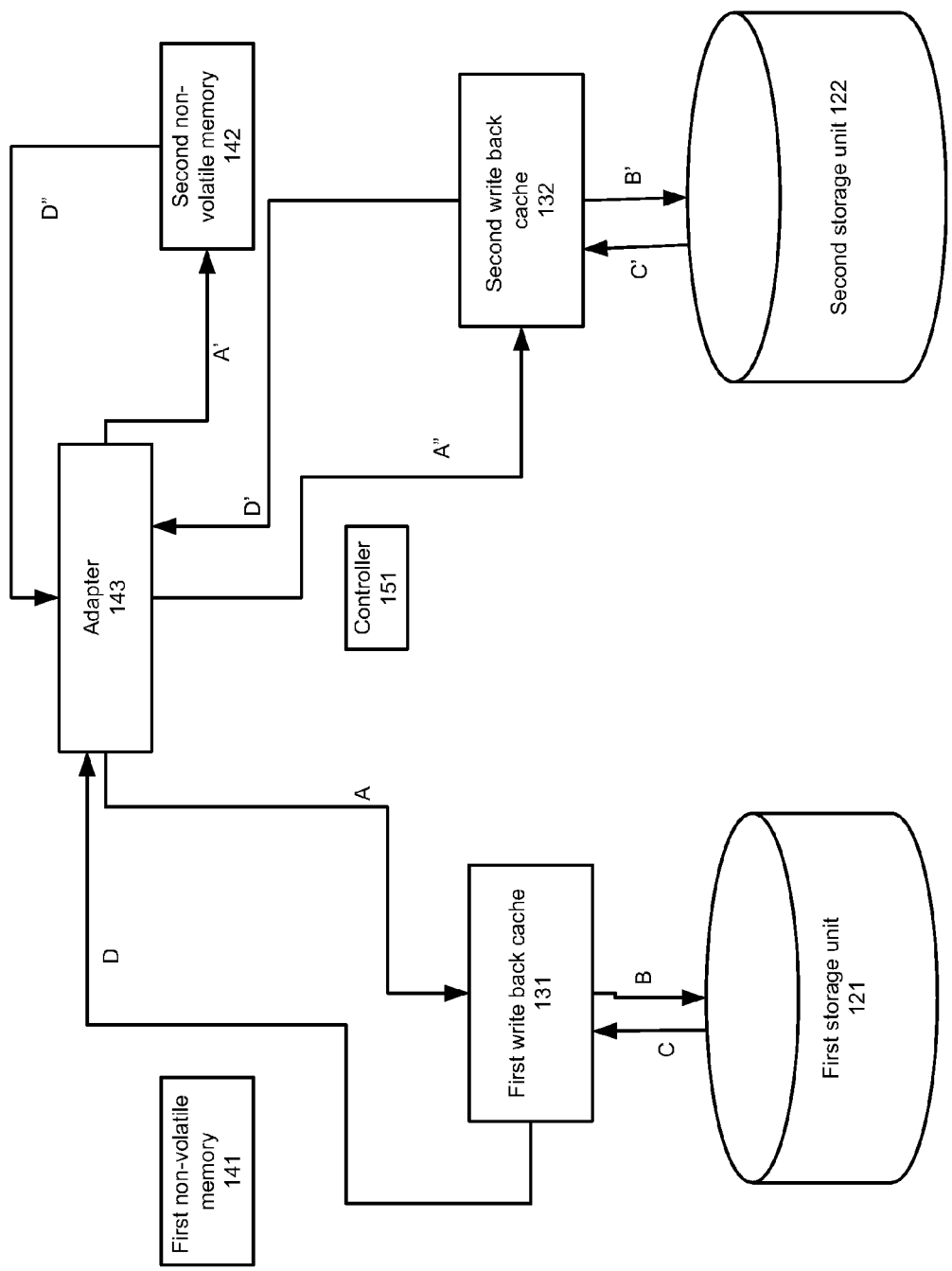
FIG. 1H illustrates an exemplary sequence of a write, read stage and destage operations, according to a further embodiment of the invention.

FIG. 1H illustrates an exemplary sequence of write, read stage and destage operations, according to a further embodiment of the invention.

FIG. 1H illustrates a cache level split architecture. A cache level split architecture system caches a new data version in both first and second write-back cache units 131 and 132. In the cache-level split architecture cached data versions are not sent from the first storage unit 121 (via a cache unit) to the second data storage unit 121. Cached data versions are sent from first write-back cache 131 to first storage unit 121 (illustrated by letter A) and are sent from second write-back cache unit 132 to second storage unit 122 (illustrated by letter A'). Older data versions are not stored in the first storage unit 121 but are stored in second storage unit 122. Second storage unit 122 receives and stores destaged data versions and older data versions.

Conveniently, destaged data versions are provided (illustrated by letter C) from first storage unit 121. Older data versions are provided (illustrated by letter C') from second storage unit. It is noted that destaged data versions can also be provided from second storage unit 122. Second non-volatile memory 142 also receives new data versions (illustrated by letter A") and can provide these data versions (illustrated by letter D") to adaptor 143.

In the cache-level split architecture data is not sent from the first storage unit 121 to the second storage unit. Conveniently, if the data storage granularity is very fine the cache-level split architecture can save many stage and destage operations. On the other hand if the data storage granularity is low this architecture performs more destage operations that can be required in a non split architecture.

Figure 1I:
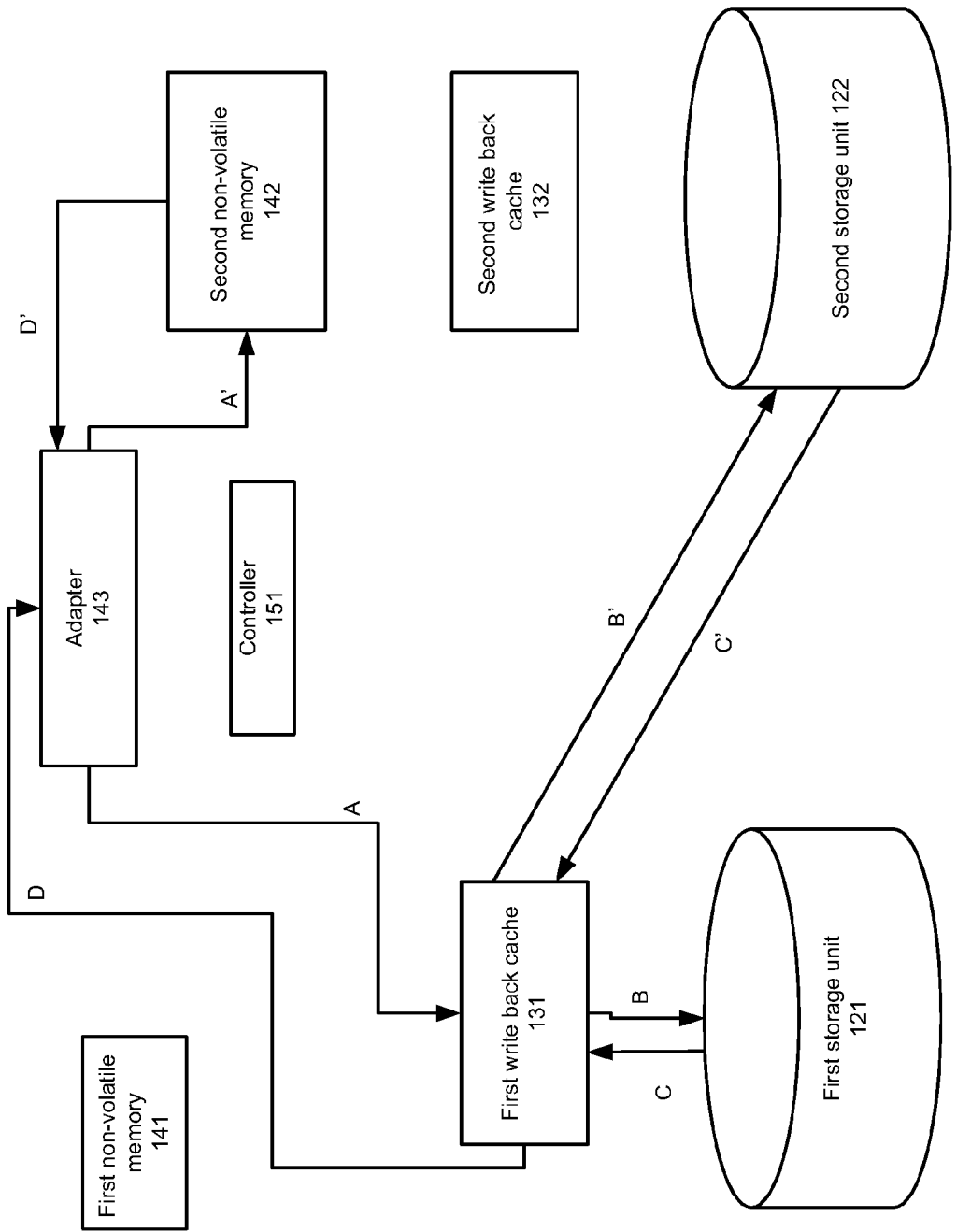
FIG. 1I illustrates an exemplary sequence of a write, read stage and destage operations, according to yet a further embodiment of the invention.

FIG. 1I illustrates an exemplary sequence of write, read stage and destage operations, according to a further embodiment of the invention.

FIG. 1I illustrates a storage unit level split architecture. A storage unit level split architecture system caches a new data version in a single write-back cache unit but sends a cached data version to first storage unit 121 (illustrated by letter B) and to second storage unit 122 (illustrated by letter B').

The first storage unit 121 does not store older data versions. Destaged data versions are provided to first write-back cache unit from the first storage unit 121 (illustrated by letter C). Older data versions are stored in second storage unit 122 and can be later provided to first write-back cache unit (illustrated by letter C') 131 from first storage unit 121. It is noted that destaged data versions can also be provided from second storage unit 122. Second non-volatile memory 142 also receives new data versions (illustrated by letter A') and can provide these data versions (illustrated by letter D').

In the storage unit level split architecture data is not sent from the first storage unit 121 to the second storage unit. Conveniently, if the data storage granularity is very fine the storage unit level split architecture can save many stages and destages.

According to another embodiment of the invention system 100" can also apply a selective storage unit level split architecture. Accordingly, system 100" can decide, before destaging a cached data version, whether to send that data version to the first storage unit or to both the first and second storage units 121 and 122.

Conveniently, if the system can determine that a cached data version is the last cached data version to be cached during a lapsed destage period then this cached data version can be sent to the first storage unit and to the second storage unit. If a cached data version should be destaged at the middle of a destage period or at the beginning of that destage period it can be destaged to the first storage unit 121.

It is noted that the cached data version can be sent to both data storage units in response to a lapse of a predefined destage period portion.

The selective storage unit split architecture acts substantially as a distributed architecture at coarse data storage granularities and acts substantially as a storage unit level split architecture at fine data storage granularities.

Figure 1J:
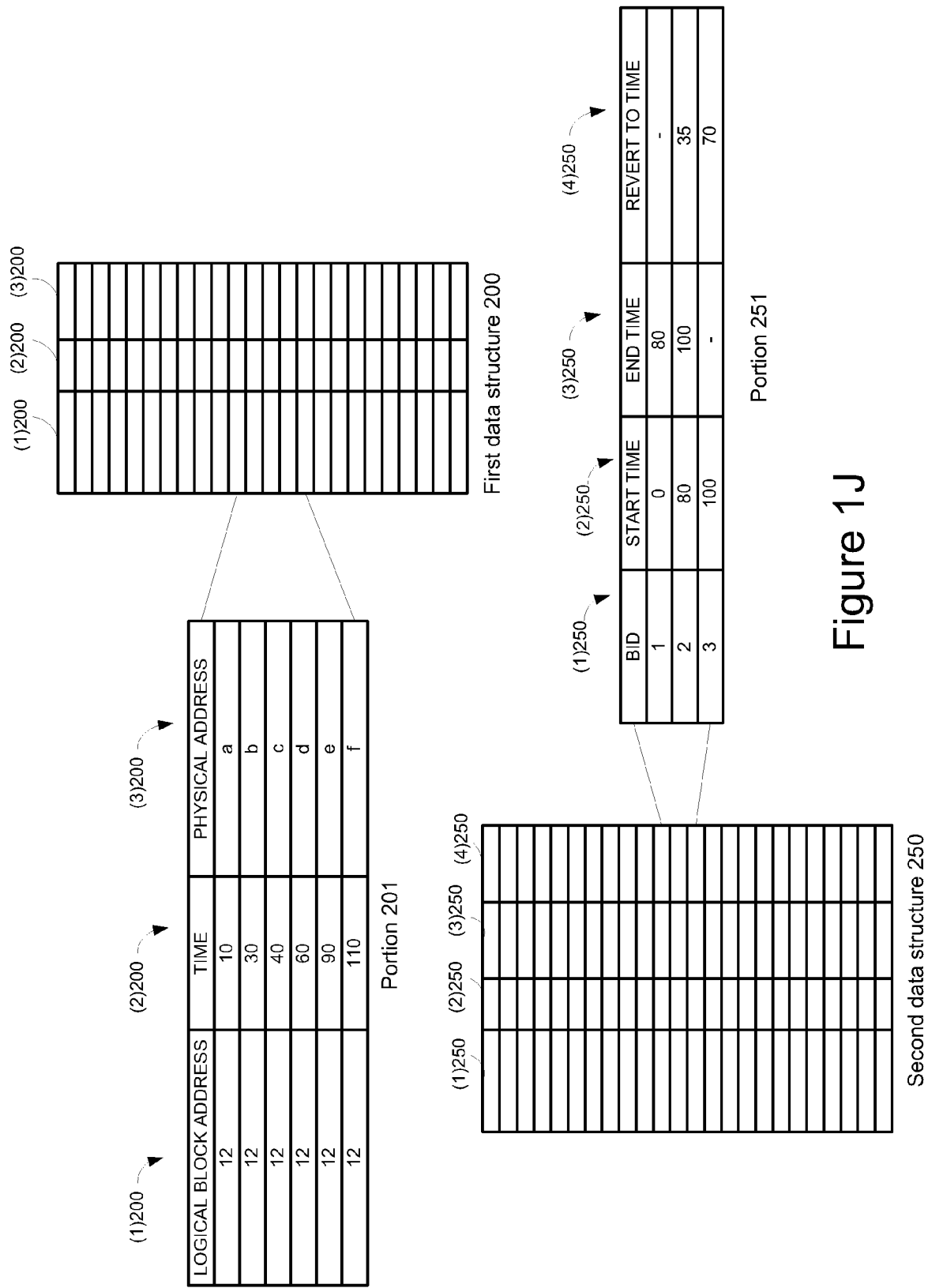
FIG. 1J illustrates two portions of a first data structure and a second data structure, according to an embodiment of the invention.

FIG. 1J illustrates two portions 201 and 251 of a first data structure and a second data structure, 200 and 250, respectively, according to an embodiment of the invention. In this example the key is an LBA together with a timestamp and the data is a physical address. However other examples could be used. For simplicity of explanation these figures illustrate read and revert operations to the same logical block address (for example LBA=12).

It is noted that the first data structure 200 includes metadata relating to write operations to other LBAs.

It is also noted that portion 201 is illustrated as representing update operations to a certain LBA but it can also represent operations relating to other LBAs. Alternatively, other graphs can represent operations relating to other LBAs.

The first data structure 200 includes three columns 200(1), 200(2) and 200(3). Each entry includes information about a write operation. The first column 200(1) includes the logical block address of the write operation, the second column 200(2) includes the write timestamp, and the third column 200(3) includes the physical address of the write operation. The logical block address and the time of write fields can be used as a key (index) to the first data structure 200(1).

It is noted that if at a certain point in time a write operation to multiple LBAs occurs then the first table will include multiple entries that reflect this write operation.

The second data structure 250 includes four columns 250(1)-250(4). The first column 250(1) includes branch identifiers, the second column 250(2) includes branch start times, the third column 250(3) includes branch end times and the fourth column 250(4) includes the revert-to-time of each branch.

Data structures 200 and 250 are adapted to control a sequence of write and revert operations in which one branch is active at each given point in time. In order to support multiple concurrent active branches these tables should be modified to include branch identification information.

Figure 2:
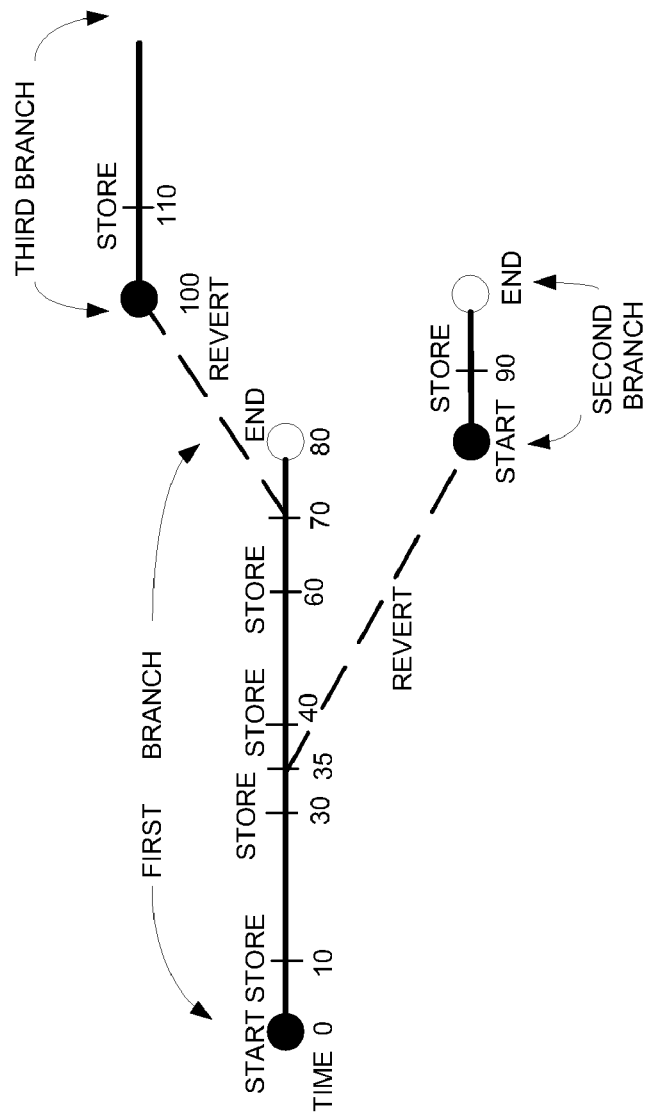
FIG. 2 illustrates an exemplary sequence of update and revert operations according to an embodiment of the invention.

FIG. 2 illustrates an exemplary sequence 101 of write and revert operations according to an embodiment of the invention. Sequence 101 includes write operations to a virtual address space such as a logical unit (LUN) at times 10, 30, 40, 60, 90 and 110, and requests (received at times 80 and 100) to revert the content of the LUN at times 35 and 70 accordingly.

Dashed lines represent the revert operation. It is noted that only one branch is active at any given point in time.

It is assumed that the write operations were associated with logical block address 12 and that the physical addresses associated with these write operations were a, b, c, d, e and f accordingly.

The first column 200(1) of the first data structure 200 indicates that the write operations were to logical block address 12. The second column 200(2) of the first data structure 200 indicates that the write operations occurred at times 10, 30, 40, 60, 90 and 110. The third column 200(3) of the first data structure 200 indicates that the physical addresses associated with these write operations were a, b, c, d, e and f.

The first entry of the second data structure 250 indicates that a first branch started at time 0 and ended at time 80. The first branch ended when a first request to revert the content of a LUN was accepted.

The second entry of the second data structure 250 indicates that a second branch started at time 80 and ended at time 100. The second branch ended when a second request to revert the content of a LUN was accepted.

The third entry of the second data structure 250 indicates that a third branch started at time 100 and did not end.

According to another embodiment of the invention the second data structure includes additional metadata such as branch statistics. Branch statistics can include, for example, the number of first data structure entries that belong to the branch, the number of different logical block addresses that were written during the duration of the branch, and the like. Conveniently, the branch statistics can assist in determining which branches to delete, especially when there are frequent read and write operations.

Figure 3:
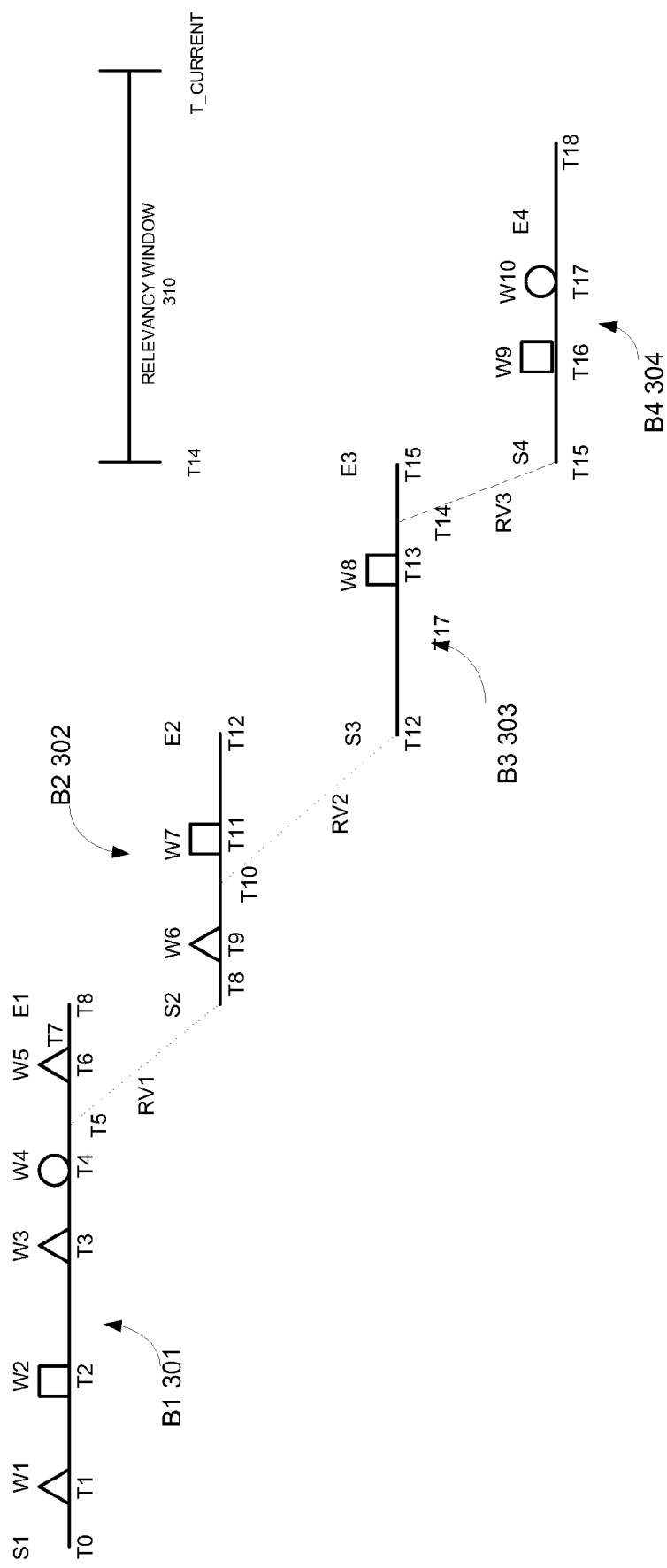
FIG. 3 illustrates an exemplary sequence of update and revert operations according to an embodiment of the invention.

FIG. 3 illustrates an exemplary sequence 300 of write and revert operations according to an embodiment of the invention.

Write operations (W1, W3, W5 and W6) to a first LBA are illustrated by triangles. Write operations (W4 and W10) to a second LBA are illustrated by circles. Write operations (W2, W7 and W9) to a third LBA are illustrated by boxes.

Sequence 300 includes four branches B1-B4 301-304 and defines a relevancy window 310 that spans between T14 and a current point in time (T_CURRENT).

The first branch (B1) starts (S1) at T0 and ends (E1) at T8. First branch B1 includes the following write operations: W1 (to first LBA) at T1, W2 (to third LBA) at T2, W3 (to first LBA) at T3, W4 (to second LBA) at T4, and W5 (to first LBA) at T6. B1 ends (E1) at T8.

The second branch (B2) 302 is a child of B1 301 and starts (S2) at time T8 by a revert operation (RV1) to time T5. Second branch B2 302 includes the following write operations: W6 (to first LBA) at T9 and W7 (to third LBA) at T11. B2 ends (E2) at T12.

The third branch (B3) 303 is a child of B2 302 and starts (S3) at time T12 by a revert operation (RV2) to time T10. The third branch B3 303 includes a single write operation that is W8 (to third LBA) at T13. B3 ends (E3) at T15.

The fourth branch (B4) 304 is a child of B3 303 and starts (S4) at time T15 by a revert operation (RV3) to time T14. B4 304 includes a write operation W9 (to third LBA) at T16 and another write operation W10 (to second LBA) at T17. The fourth branch B4 304 ends (E4) at T18.

Figure 4:
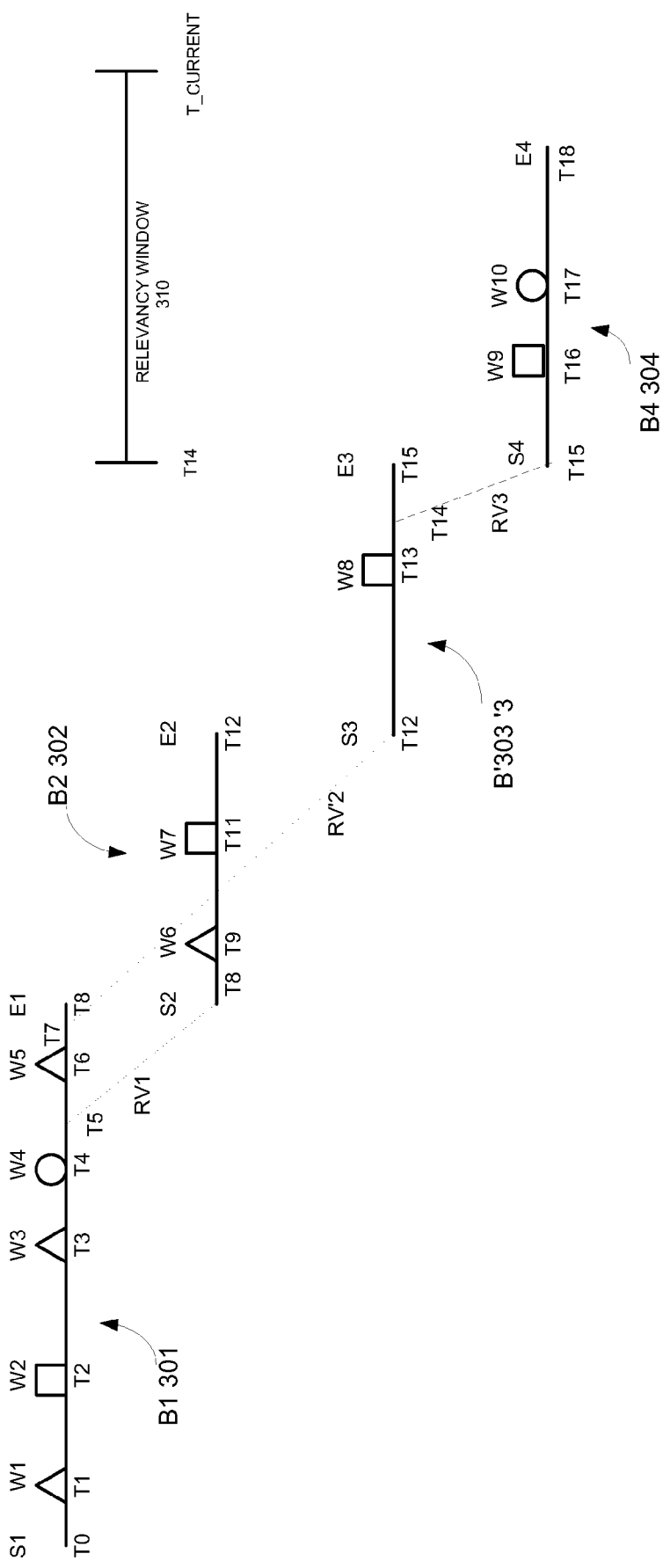
FIG. 4 illustrates an exemplary sequence of update and revert operations according to another embodiment of the invention.

FIG. 4 illustrates an exemplary sequence 300' of write and revert operations according to another embodiment of the invention.

Sequence 300' differs from sequence 300 by the time to revert of the second revert operation (RV2'). The revert-to-time is T7 (that belongs to first branch B1 301) and not T10 (that belongs to second branch B2 302). Thus, the second branch B2 302 that had a child branch (B3 303) in sequence 300 does not have a child in sequence 300'.

Figure 5:
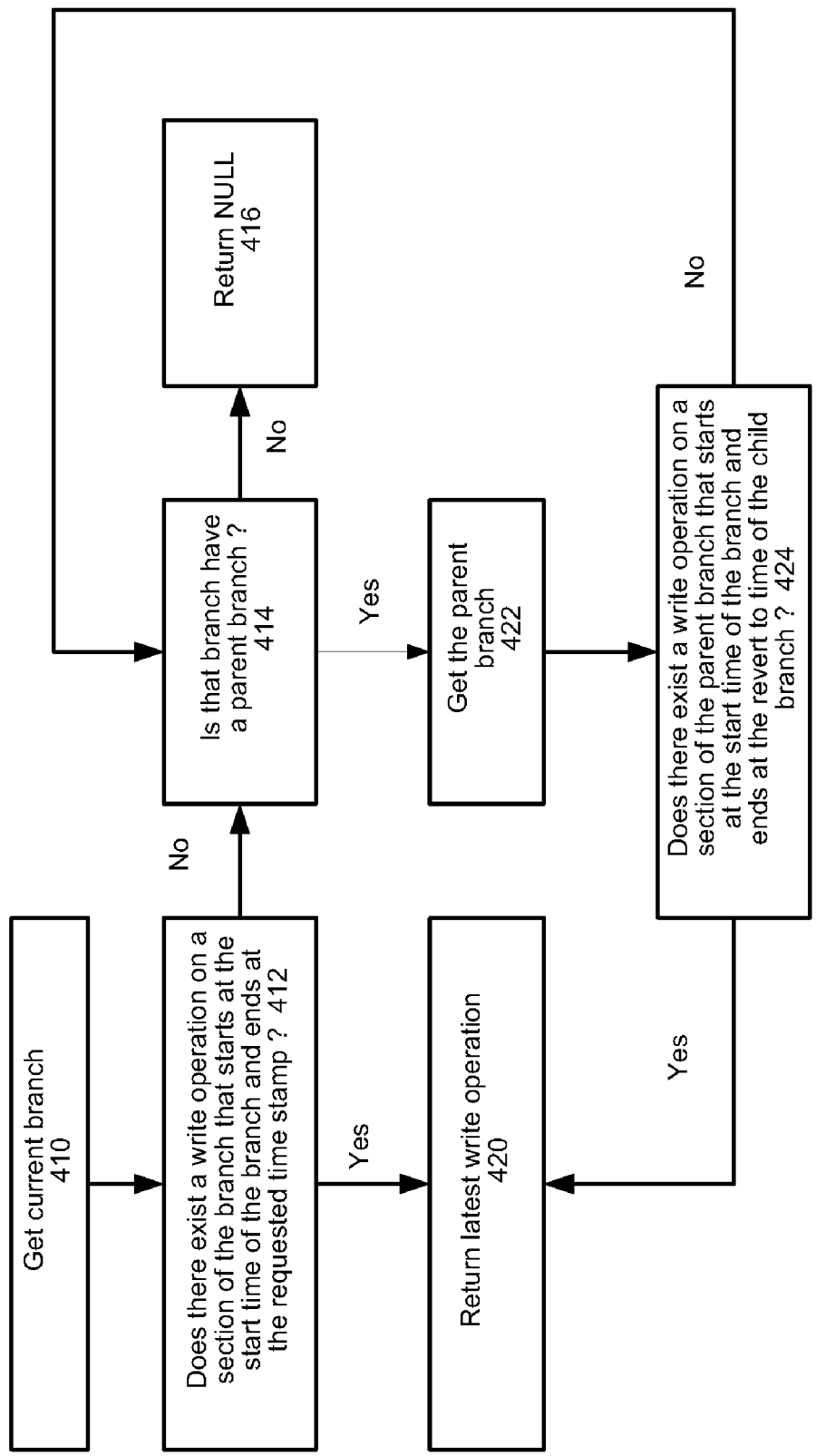
FIG. 5 illustrates a method for retrieving a data version, according to an embodiment of the invention.

FIG. 5 illustrates a method 400 for retrieving a data version, according to an embodiment of the invention.

Method 400 starts by stage 410 of selecting or getting a current branch. Stage 410 is followed by stage 412 of checking if there exists a write operation on a section of that branch that starts at the start of the branch and ends at the requested time stamp associated with the retrieval request of the data version. If the answer is negative stage 412 is followed by stage 414, else stage 412 is followed by stage 420.

Stage 420 includes returning the latest write operation as the outcome of method 400.

Stage 414 includes checking if the branch has a parent branch. If the answer is negative method 400 ends by stage 416 of returning a negative answer (Null). If the answer is positive than stage 414 is followed by stage 414 of getting the branch parent and stage 424 of checking if there exists a write operation on a section of that parent branch that starts at the start of the branch and ends at a revert to time associated with the child branch of the examined parent branch. If the answer is negative stage 424 is followed by stage 414, else stage 424 is followed by stage 420.

Figure 6:
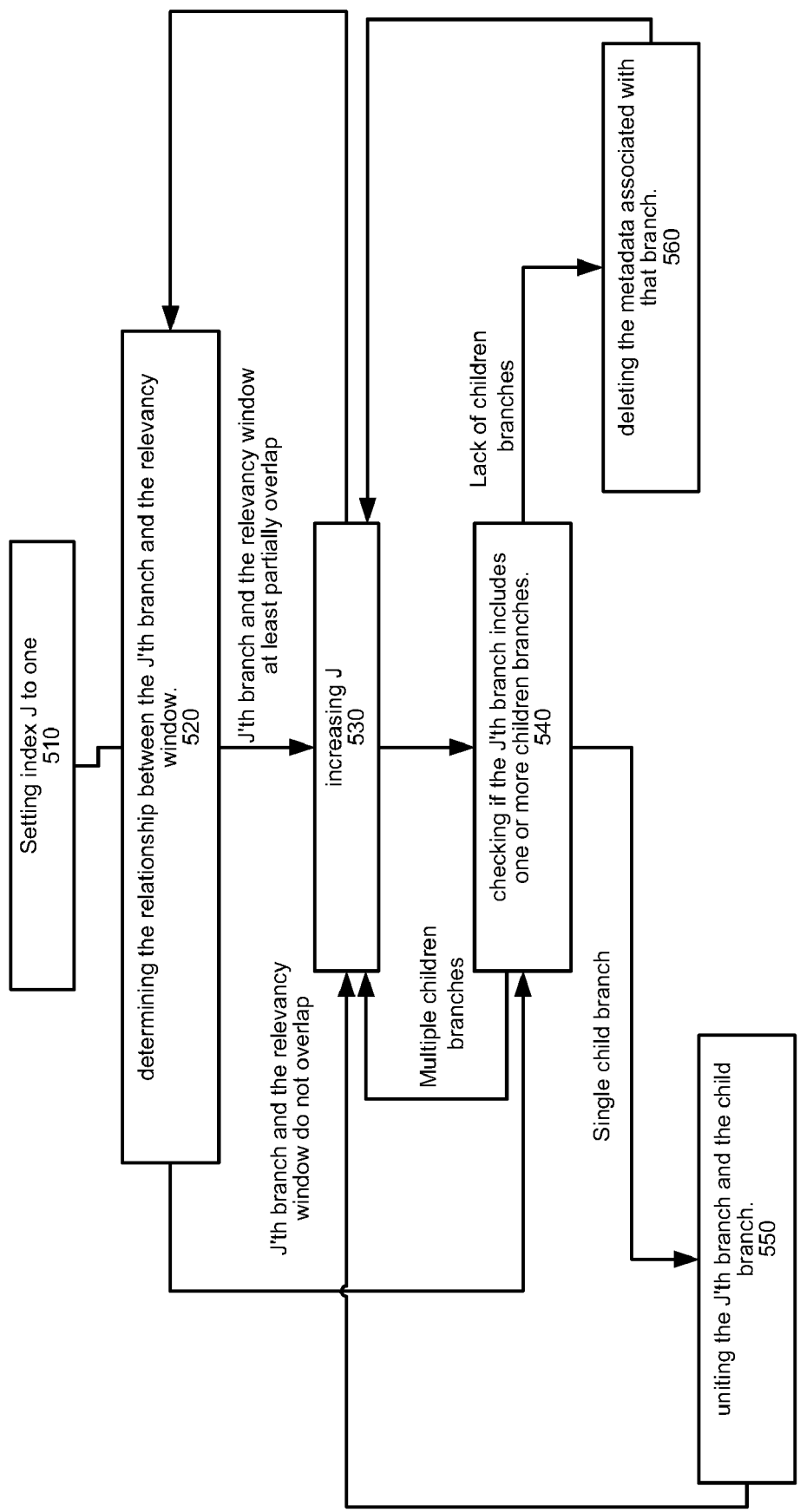
FIG. 6 illustrates a coarse analysis according to an embodiment of the invention.

FIG. 6 illustrates a coarse analysis according to an embodiment of the invention.

The coarse analysis 500 starts by stage 510 of setting a branch index (J) to one.

Stage 510 is followed by stage 520 of determining the relationship between the J'th branch and the relevancy window.

If the J'th branch and the relevancy window at least partially overlap then the J'th branch is not deleted and stage 520 is followed by stage 530 of increasing J and jumping to stage 520. It is noted that this iteration ends when the whole second data structure is scanned.

If the J'th branch and the relevancy window do not overlap (even not partially overlap) then stage 520 is followed by stage 540 of checking if the J'th branch includes one or more children branches.

If the J'th branch has a single branch child then stage 540 is followed by stage 550 of uniting the J'th branch and the child branch. According to an embodiment of the invention stage 550 includes marking the branch as a branch that should be united (for example, by moving the last entry before the revert-to-time of the child branch to the start time of the child branch).

If the J'th branch is outside the relevancy window and does not have any children then stage 550 is followed by stage 560 of deleting the metadata associated with that branch. According to an embodiment of the invention stage 560 includes marking the branch as a branch that should be deleted. The deletion can be made during the execution of the fine analysis.

If there are multiple children branches then stage 540 is followed by stage 530.

Stages 560 and 550 are followed by stage 530.

For example, referring to FIG. 3, the fourth branch B4 304 is within the relevancy window and the first till third branches are ancestors of the fourth branch. Accordingly, no branch is deleted.

Yet for another example, referring to FIG. 4, second branch B2 302 is not a ancestor of the fourth branch B4 304 and is outside the relevancy window, thus it can be deleted.

It is noted that the deletion can include marking the branch as a candidate for deletion, performing a fine analysis that is responsive to such a mark, and just then deleting the branch.

Figure 7A:
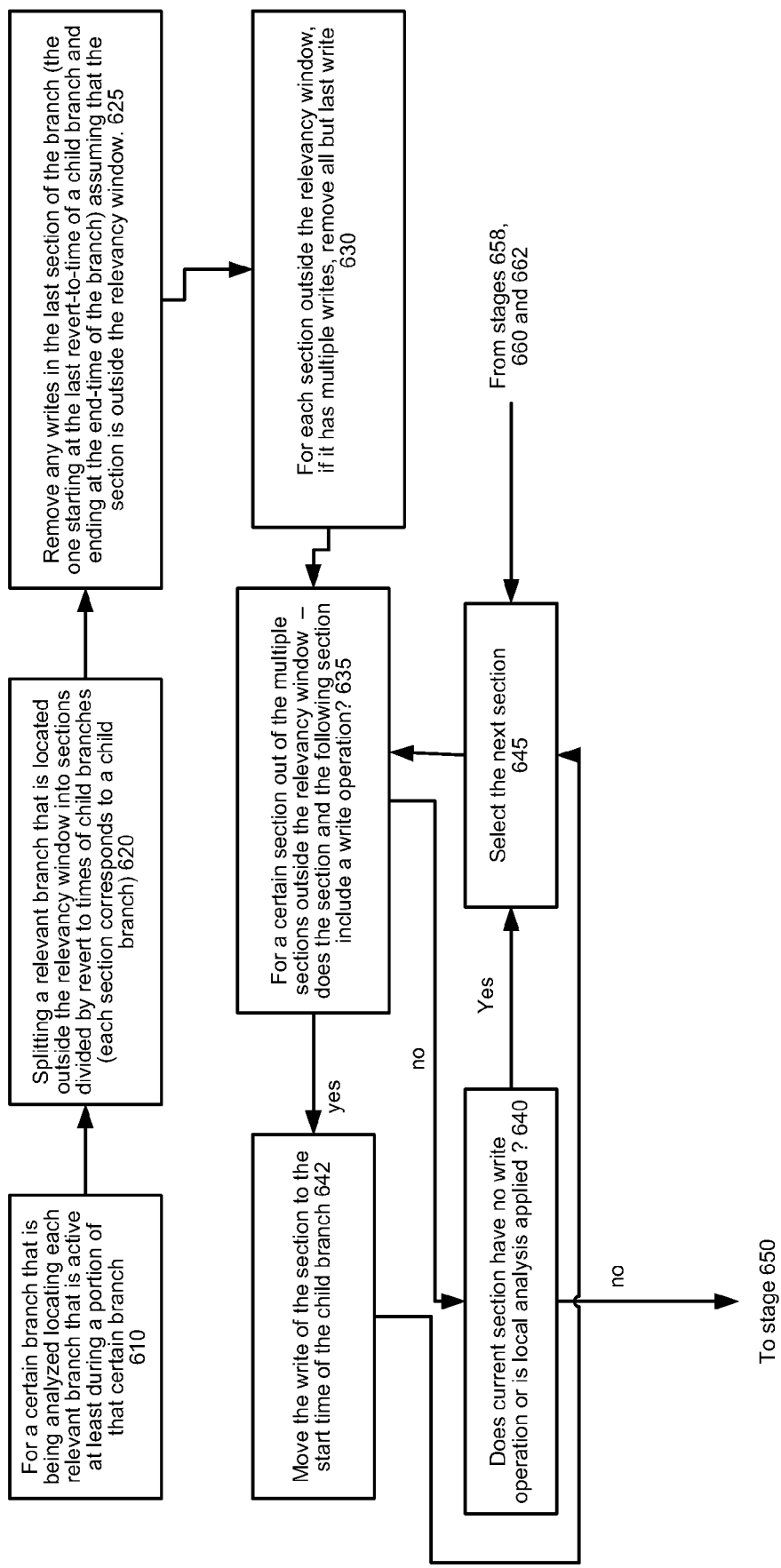
FIGS. 7a and 7b illustrate a global fine analysis according to an embodiment of the invention.
Figure 7B:
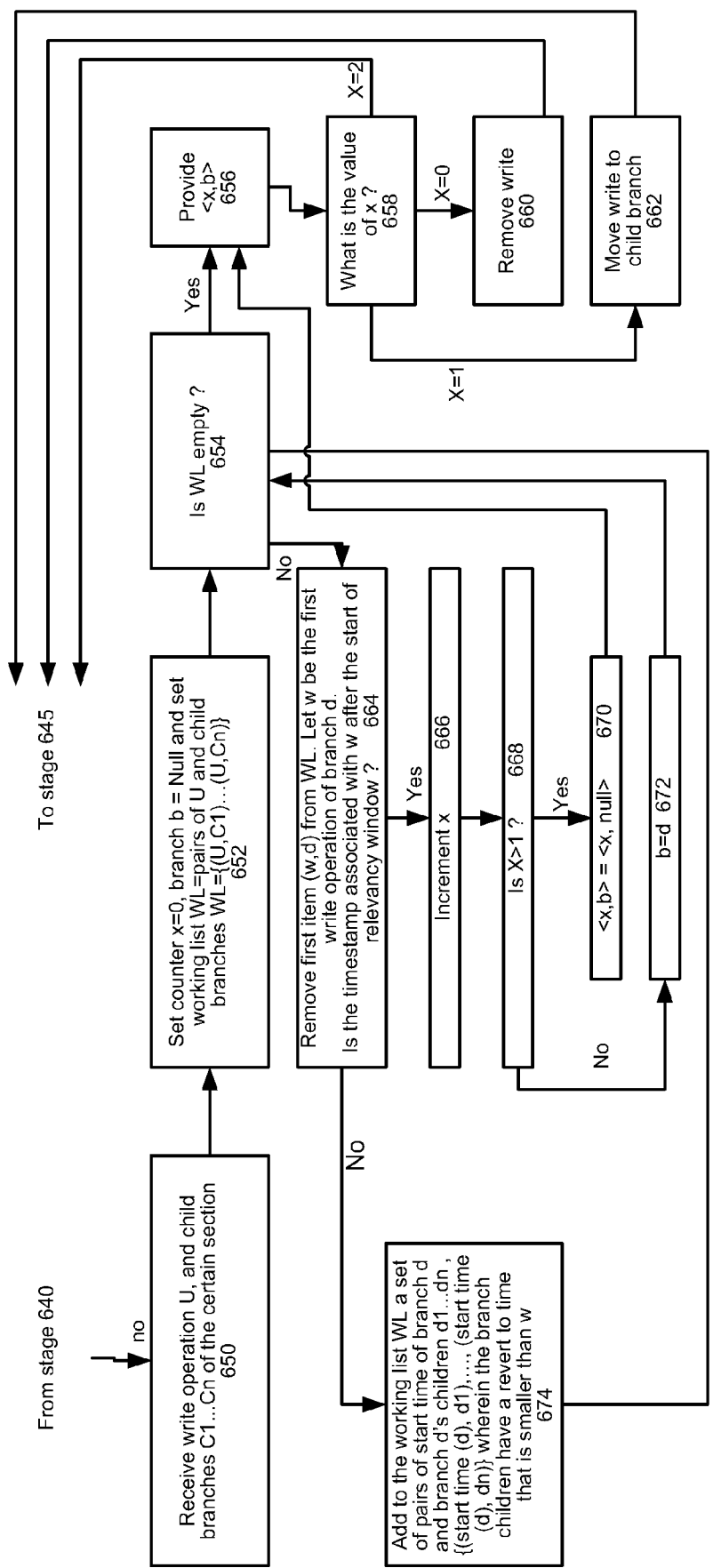

FIGS. 7a-7b illustrates a global fine analysis 600 according to an embodiment of the invention.

FIG. 7a illustrates a first portion 600(a) of analysis 600 while FIG. 7b illustrates portion 600(b) of analysis 600.

The global fine analysis is executed for a certain branch. It can then be executed for another branch. The global fine analysis 600 starts by stage 610 of locating each branch that is active at least during a portion of that certain branch. Each such branch is referred to as relevant branch.

Stage 610 is followed by stage 620 of splitting a relevant branch located outside the relevancy window to sections divided by revert to times of child branches. Each section is associated with a child branch.

Stage 620 is followed by stage 625 of removing any write operations in the last section of the branch (the section that starts at the last revert to time of a child branch and ending at the end time of the branch) assuming that the section is outside the relevancy window.

Stage 625 is followed by stage 630 of removing all write operations (except of the last write) of a section (outside the relevancy window) if it has multiple writes.

Stage 630 is followed by stage 635 of determining, for a certain section out of the multiple sections, does the section and the following section include a write operation. If the answer is positive then stage 635 is followed by stage 642 of moving the write section to the start time of the child branch. If the answer is negative then stage 635 is followed by stage 640 of determining whether the current section have no write operation or is local fine analysis is applied. If the answer is yes then stage 640 is followed by stage 650, else it is followed by stage 645 of selecting the next section out of the multiple sections and jumping to stage 635.

Stage 650 includes receiving a certain write operation U and child branches C1 ... Cn of the certain section. Stage 650 is followed by stage 652 of setting counter X to zero, setting branch b to null and defining (or setting) a working list WL to be equal a pair of write operation U and the child branches: WL={(U,C1), ... , (U,Cn)}.

Stage 652 is followed by stage 654 of determining if WL is empty. If the answer is positive stage 654 is followed by stage 656, if the answer is negative stage 654 is followed by stages 664.

Stage 656 includes providing <x,b>. Stage 656 is followed by stage 658 of checking the value of x. If x=0 then stage 658 is followed by stage 660 or removing a write operation. Stage 660 is followed by stage 645. If x=1 stage 658 is followed by stage 662 of moving the write operation to a child branch. If x=2 stage 658 is followed by stage 645. Stage 662 is followed by stage 645.

Stage 664 includes removing the first item (referred to as (w,d) from WL and checking if the first write operation in branch d occurred after the beginning of the relevancy window. If the answer is negative stage 664 is followed by stage 674, else it is followed by stage 666. Stage 666 includes increasing x and it is followed by stage 668 of checking if x is greater than one. If x zero or one stage 668 is followed by stage 670 of setting <x,b> to <x,null> and jumping to stage 656. If x>1 then stage 668 is followed by stage 672 of setting b to 2 and jumping to stage 654.

Stage 674 includes adding to the working list a set of pairs of start time of branch d and branch d's children that have a revert to time that is smaller than the time of w. WL={(start time(d) ... d1), (start time(d), dn)}. Stage 674 is followed by stage 654.

It is noted that most of the mentioned above examples referred to a scenarios in which only one active branch exists per any point in time. As mentioned above this is not necessarily so. In order to support multiple coexisting branches additional metadata is required for selecting between multiple co-existing branches. This additional metadata can include branch identifier, parent branch identifier and the like.

Multiple branches can co-exist in various scenarios such as but not limited to testing environments, an implementation of host addressable logical units that support many snapshots, and the like.

It is noted that if multiple branches co-exist then the addition of a new branch (for example by performing a revert operation) does not necessarily terminate another branch. According to an embodiment of the invention a third data structure is defined.

The third data structure includes the first write operation to each LBA. Such a table can simplify various scanning sequences. Yet for another example, another data structure that includes the last write operation per branch can also be defined. According to another embodiment of the invention the B-Tree is replaced by a prefix B-tree.

An alternative solution is to make B-Tree entries be only the logical-track-number, without a time component, and to store in the tree leaves a variable-length structure with all the LBA entries and their time information.

Figure 8:
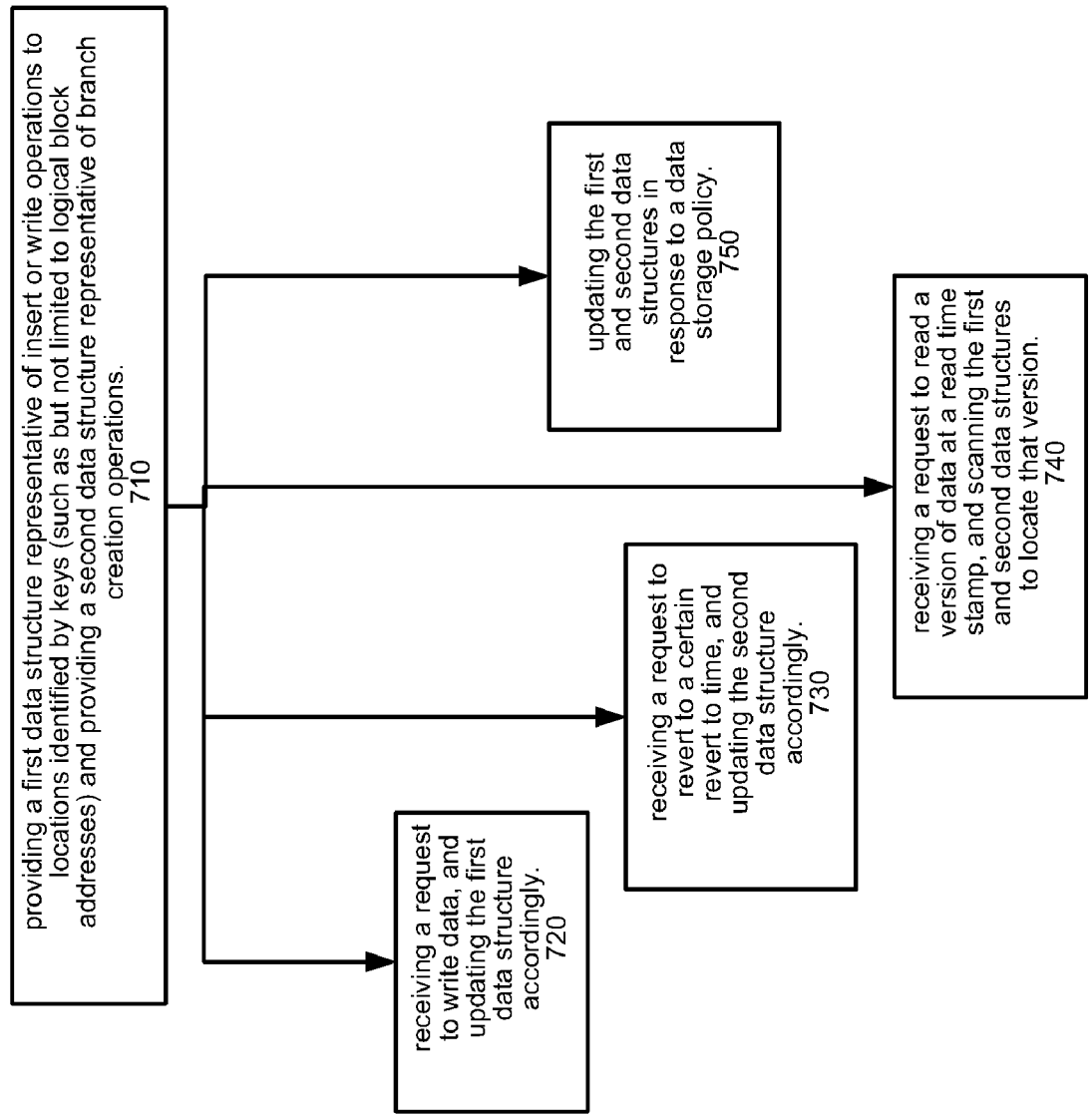
FIG. 8 illustrates a method for managing data, according to an embodiment of the invention.

FIG. 8 illustrates method 700 for managing data, according to an embodiment of the invention.

Method 700 starts by stage 710 of providing a first data structure representative of write operations to information identified by a key such as but not limited to a logical block addresses and providing a second data structure representative of branch creation operations such as but not limited to revert operations, branch cloning operation and the like. Conveniently, the first data structure includes a write timestamp and a mapping between a logical block address and an associated physical address. Conveniently, the second data structure includes branch identifiers, branch start time, branch end time and branch revert to time. Conveniently the first data structure is a B-Tree.

Stage 710 is followed by stages 720, 730, 740 and 750.

Stage 720 includes receiving a request to write or update data, and updating the first data structure accordingly.

Stage 730 includes receiving a request to create a branch that starts by a version of data at a requested timestamp, and updating the second data structure accordingly. For example, the request to create a branch can be a result of a request to revert the data to a certain revert-to-time (and the revert-to-time is regarded as the requested time). Yet for another example, the request to create a branch can be a result of a request to logically duplicate (clone) the data and in this case the time of the request is the requested time.

Stage 740 includes receiving a request to read a version of data at a read time stamp, and scanning the first and second data structures to locate that version. Stage 740 can include one or more stages of method 400.

Stage 750 includes updating the first and second data structures in response to a data storage policy. Stage 750 can include performing a coarse analysis, performing a fine analysis and the like. Stage 750 can include one or more stages illustrated in FIGS. 6 and 7.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention data is written to a write-back cache, and current as well and previous versions of data are sent to one or more storage units such as disks, disk arrays, tapes and the like. The data storage policy helps to refresh the data as well as the metadata and also assists in determining whether to send a certain data version to the disk or not.

The present invention may be provided as a service to a customer over a network. In particular, the service may provide storing and retrieving data.

Conveniently, a method of providing a service to a customer over a network is provided. The method includes: receiving, over a network, a request to lookup a version of data at a read timestamp; scanning a first data structure and a second data structure to locate that version of data; wherein the first data structure is representative of insert or update operations to entries identified by keys and the second data structure is representative of branch creation operations and the second data structure stores branch identifiers and branch timing information; providing the version of data at the read timestamp; receiving, over a network, a request to create a branch that starts by a version of data at a requested timestamp; and updating the second data structure accordingly.

Conveniently, the first data structure is a B-Tree.

Conveniently, the method includes receiving, over a network, a request to update a value associated with a given key and updating the first data structure.

Conveniently, the method includes updating by adding a new entry with the given key and associated data nd the current timestamp.

Conveniently, the key is a logical block address.

Conveniently, the request to create a branch is a revert operation and wherein the certain time stamp is a revert-to time.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A computer-implemented method for managing data, comprising the steps of:

under control of instructions residing in a computer-readable storage medium performing respective data update operations comprising writing updated data into a storage unit, the storage unit comprising a continuous data protection system (CDP) for maintaining multiple versions of the updated data;

establishing first entries in a first data structure that describe the update operations, the first entries comprising a timestamp that indicates an update time of the update operations, and being indexed by a key comprising a logical block address;

establishing second entries in a second data structure comprising a table, each second entry having a start time, an end time, a revert-to time, and a time interval that is defined by the start time and end time, the second entries including parent entries and child entries, wherein for each of the child entries, the revert-to time thereof falls within the time interval of its parent entry, each second entry corresponding to a set of update operations occurring during the time interval thereof, the second entries including an initial parent entry;

defining an initial sequence of update operations that defines a first evolution of the updated data over time, wherein the update time thereof occurs during the time interval of the initial parent entry;

responsively to a reversion request to update the initial sequence beginning at a given point in time, adding an initial child entry to the table, wherein the revert-to time thereof is set at the given point and falls within the time interval of the initial parent entry;

reverting the initial sequence to a reverted sequence of update operations by recursively scanning the first data structure, wherein update times in the reverted sequence occur during a first reverted time interval beginning at the start time of the initial parent entry and ending at the revert-to time of the initial child entry or during a second reverted time interval beginning at the start time of the initial child entry;

defining a relevancy window of time wherein it is possible to establish a new child entry in the table, wherein the revert-to time thereof falls in the relevancy window;

determining data accessibility in the storage unit by identifying first update operations, wherein update times thereof fall within the relevancy window and identifying second update operations in the reverted sequence; and designating the undated data of the first update operations and the second update operations as accessible data;

deleting the undated data other than the accessible data from the storage unit; and accessing updated data in the reverted sequence in the storage unit.

2. The computer-implemented method according to claim 1, wherein establishing first entries in the first data structure comprises establishing B-tree entries as nodes of a B-tree.

3. The computer-implemented method according to claim 1, wherein accessing updated data comprises:

accepting a lookup request having a lookup timestamp to access a portion of the updated data that is associated with a given key; and referencing ones of the first entries having update operations occurring within the time interval of the initial parent entry or the time interval of the initial child entry to identify valid updated data at the lookup timestamp.

4. The computer-implemented method according to claim 1, wherein detecting data accessibility includes a coarse analysis that comprises identifying an end portion of the time interval of one of the second entries, wherein the end portion is outside the relevancy window, the one second entry, and wherein the end portion begins at the latest revert-to time of child entries of the one second entry.

5. The computer-implemented method according to claim 4, further comprising performing a fine analysis that comprises scanning at least a subset of the first entries to associate combinations of a particular key with the one second entry and to recursively scan descendant child entries of the one second entry.

6. The computer-implemented method according to claim 1, further comprising the step of:

identifying ones of the second entries wherein the time interval thereof is outside the relevancy window and which lack child entries; and deleting the identified second entries from the table, and deleting from the storage unit the updated data indicated by ones of the first entries that correspond to the identified second entries.

7. The computer-implemented method according to claim 1, wherein the storage unit comprises a plurality of storage modules that are adapted to store the multiple versions, wherein defining the initial sequence comprises:

maintaining a forward data structure indicative of ones of the multiple versions required to be transferred from a first one of the storage modules to a second one of the storage modules;

maintaining a backward data structure indicative of whether a most recently updated one of the multiple versions resides in the first one or the second one of the storage modules;

responsively to information in the forward data structure and the backward data structure transferring a selected one of the multiple versions from the first one to the second one of the storage modules; and refreshing the first data structure by updating the key of a corresponding one of the first entries to reflect the update time corresponding to the selected one of the multiple versions.

8. A computer software product for managing data, including a computer-readable storage medium in which computer program instructions are stored, which instructions, when executed by a computer, cause the computer to perform a method comprising the steps of:

performing respective data update operations comprising writing updated data into a storage unit, the storage unit comprising a continuous data protection system (CDP) for maintaining multiple versions of the updated data;

establishing first entries in a first data structure that describe the update operations, the first entries comprising a timestamp that indicates an update time of the update operations, and being indexed by a key comprising a logical block address;

establishing second entries in a second data structure comprising a table, each second entry having a start time, an end time, a revert-to time, and a time interval that is defined by the start time and end time, the second entries including parent entries and child entries, wherein for each of the child entries, the revert-to time thereof falls within the time interval of its parent entry, each second entry corresponding to a set of update operations occurring during the time interval thereof, the second entries including an initial parent entry;

defining an initial sequence of update operations that defines a first evolution of the updated data over time, wherein the update time thereof occurs during the time interval of the initial parent entry;

responsively to a reversion request to update the initial sequence beginning at a given point in time, adding an initial child entry to the table, wherein the revert-to time thereof is set at the given point and falls within the time interval of the initial parent entry;

reverting the initial sequence to a reverted sequence of update operations by recursively scanning the first data structure, wherein update times in the reverted sequence occur during a first reverted time interval beginning at the start time of the initial parent entry and ending at the revert-to time of the initial child entry or during a second reverted time interval beginning at the start time of the initial child entry;

defining a relevancy window of time wherein it is possible to establish a new child entry in the table, wherein the revert-to time thereof falls in the relevancy window;

determining data accessibility in the storage unit by identifying first update operations, wherein update times thereof fall within the relevancy window and identifying second update operations in the reverted sequence; and designating the undated data of the first update operations and the second update operations as accessible data;

deleting the updated data other than the accessible data from the storage unit; and accessing updated data in the reverted sequence in the storage unit.

9. The computer software product according to claim 8, wherein establishing first entries in the first data structure comprises establishing B-tree entries as nodes of a B-tree.

10. The computer software product according to claim 8, wherein accessing updated data comprises:

accepting a lookup request having a lookup timestamp to access a portion of the updated data that is associated with a given key; and referencing ones of the first entries having update operations occurring within the time interval of the initial parent entry or the time interval of the initial child entry to identify valid updated data at the lookup timestamp.

11. The computer software product according to claim 8, wherein detecting data accessibility includes a coarse analysis that comprises identifying an end portion of the time interval of one of the second entries, wherein the end portion is outside the relevancy window, the one second entry, and wherein the end portion begins at the latest revert-to time of child entries of the one second entry.

12. The computer software product according to claim 11, wherein the instructions further cause the computer to perform a fine analysis that comprises scanning at least a subset of the first entries to associate combinations of a particular key with the one second entry and to recursively scan descendant child entries of the one second entry.

13. The computer software product according to claim 8, wherein the instructions cause the computer to perform the additional steps of:

identifying ones of the second entries wherein the time interval thereof is outside the relevancy window and which lack child entries; and deleting the identified second entries from the table, and deleting from the storage unit the updated data indicated by ones of the first entries that correspond to the identified second entries.

14. The computer software product according to claim 8, wherein the storage unit comprises a plurality of storage modules that are adapted to store the multiple versions, wherein defining the initial sequence comprises:

maintaining a forward data structure indicative of ones of the multiple versions required to be transferred from a first one of the storage modules to a second one of the storage modules;

maintaining a backward data structure indicative of whether a most recently updated one of the multiple versions resides in the first one or the second one of the storage modules;

responsively to information in the forward data structure and the backward data structure transferring a selected one of the multiple versions from the first one to the second one of the storage modules; and refreshing the first data structure by updating the key of a corresponding one of the first entries to reflect the update time corresponding to the selected one of the multiple versions.

15. A data processing system for managing data, comprising:

a controller;

a memory accessible by the controller;

a storage unit accessible by the controller, the storage unit comprising a continuous data protection system (CDP) for maintaining multiple versions of data being managed, wherein the controller is operative to perform the steps of:

performing respective data update operations comprising writing updated data into the storage unit;

establishing first entries in a first data structure that describe the update operations, the first entries comprising a timestamp that indicates an update time of the update operations, and being indexed by a key comprising a logical block address;

establishing second entries in a second data structure comprising a table, each second entry having a start time, an end time, a revert-to time, and a time interval that is defined by the start time and end time, the second entries including parent entries and child entries, wherein for each of the child entries, the revert-to time thereof falls within the time interval of its parent entry, each second entry corresponding to a set of update operations occurring during the time interval thereof, the second entries including an initial parent entry;

defining an initial sequence of update operations that defines a first evolution of the updated data over time, wherein the update time thereof occurs during the time interval of the initial parent entry;

responsively to a reversion request to update the initial sequence beginning at a given point in time, adding an initial child entry to the table, wherein the revert-to time thereof is set at the given point and falls within the time interval of the initial parent entry;

reverting the initial sequence to a reverted sequence of update operations by recursively scanning the first data structure, wherein update times in the reverted sequence occur during a first reverted time interval beginning at the start time of the initial parent entry and ending at the revert-to time of the initial child entry or during a second reverted time interval beginning at the start time of the initial child entry;

defining a relevancy window of time wherein it is possible to establish a new child entry in the table, wherein the revert-to time thereof falls in the relevancy window;

determining data accessibility in the storage unit by identifying first update operations, wherein update times thereof fall within the relevancy window and identifying second update operations in the reverted sequence; and designating the undated data of the first update operations and the second update operations as accessible data;

deleting the undated data other than the accessible data from the storage unit; and accessing updated data in the reverted sequence in the storage unit.

16. The data processing system according to claim 15, wherein establishing first entries in the first data structure comprises establishing B-tree entries as nodes of a B-tree.

17. The data processing system according to claim 15, wherein accessing updated data comprises:

accepting a lookup request having a lookup timestamp to access a portion of the updated data that is associated with a given key; and referencing ones of the first entries having update operations occurring within the time interval of the initial parent entry or the time interval of the initial child entry to identify valid updated data at the lookup timestamp.

18. The data processing system according to claim 15, wherein detecting data accessibility includes a coarse analysis that comprises identifying an end portion of the time interval of one of the second entries, wherein the end portion is outside the relevancy window, the one second entry, and wherein the end portion begins at the latest revert-to time of child entries of the one second entry.

19. The data processing system according to claim 18, wherein the controller is operative to perform a fine analysis that comprises scanning at least a subset of the first entries to associate combinations of a particular key with the one second entry and to recursively scan descendant child entries of the one second entry.

20. The data processing system according to claim 15, wherein the controller is operative to perform the additional steps of:

identifying ones of the second entries wherein the time interval thereof is outside the relevancy window and which lack child entries; and deleting the identified second entries from the table, and deleting from the storage unit the updated data indicated by ones of the first entries that correspond to the identified second entries.

21. The data processing system according to claim 15, wherein the storage unit comprises a plurality of storage modules that are adapted to store the multiple versions, wherein defining the initial sequence comprises:

maintaining a forward data structure indicative of ones of the multiple versions required to be transferred from a first one of the storage modules to a second one of the storage modules;

maintaining a backward data structure indicative of whether a most recently updated one of the multiple versions resides in the first one or the second one of the storage modules;

responsively to information in the forward data structure and the backward data structure transferring a selected one of the multiple versions from the first one to the second one of the storage modules; and refreshing the first data structure by updating the key of a corresponding one of the first entries to reflect the update time corresponding to the selected one of the multiple versions.

\* \* \* \* \*